(12) United States Patent
Wenzel et al.

(10) Patent No.: US 7,233,699 B2
(45) Date of Patent: *Jun. 19, 2007

(54) PATTERN MATCHING USING MULTIPLE TECHNIQUES

(75) Inventors: Lothar Wenzel, Round Rock, TX (US); Nicolas Vazquez, Austin, TX (US); Kevin L. Schultz, Georgetown, TX (US); Dinesh Nair, Austin, TX (US)

(73) Assignee: National Instruments Corporation, Austin, TX (US)

( * ) Notice: Subject to any disclaimer, the term of this patent is extended or adjusted under 35 U.S.C. 154(b) by 823 days.

This patent is subject to a terminal disclaimer.

(21) Appl. No.: 10/100,418

(22) Filed: Mar. 18, 2002

(65) Prior Publication Data

US 2003/0174891 A1    Sep. 18, 2003

(51) Int. Cl.
*G06K 9/62*    (2006.01)
(52) U.S. Cl. .............. 382/209; 382/103; 382/141; 382/203
(58) Field of Classification Search .......... 382/209, 382/217, 218, 103, 141, 203
See application file for complete search history.

(56) References Cited

U.S. PATENT DOCUMENTS

| 5,444,543 | A | * | 8/1995 | Sakano ............... 358/296 |
| 5,828,777 | A | | 10/1998 | Suzuki |
| 6,463,163 | B1 | * | 10/2002 | Kresch ............... 382/103 |
| 6,658,148 | B1 | * | 12/2003 | Fung et al. .......... 382/209 |
| 6,683,973 | B2 | * | 1/2004 | Li et al. ............. 382/132 |
| 6,807,305 | B2 | * | 10/2004 | Rajagopal et al. ..... 382/209 |

(Continued)

FOREIGN PATENT DOCUMENTS

EP    0 751 475    1/1997

(Continued)

OTHER PUBLICATIONS

Terry Caelli and David Reye "On the Classification of Image Regions by Colour Texture and Shape," Pattern Recognition, vol. 26, No. 4, pp. 461-470, 1993.

(Continued)

*Primary Examiner*—Gregory Desire
(74) *Attorney, Agent, or Firm*—Meyertons Hood Kivlin Kowert & Goetzel, P.C.; Jeffrey C. Hood; Mark S. Williams

(57) ABSTRACT

A system and method for performing pattern matching to locate zero or more instances of a template image in a target image. An image is received by a computer from an image source, e.g., a camera. First pattern matching is performed on the image using a first pattern matching technique to determine a plurality of candidate areas. Second pattern matching is performed on each of the candidate areas using a second different pattern matching technique to generate final pattern match results. An output is generated indicating the final pattern match results. The second pattern matching may determine a second plurality of candidate areas which may be analyzed to determine the final pattern match results. The first pattern matching may use a plurality of pattern matching techniques, the results of which may be used to select a best technique from the plurality of techniques to use for the second pattern match.

71 Claims, 11 Drawing Sheets

U.S. PATENT DOCUMENTS

| | | | |
|---|---|---|---|
| 6,856,341 B2* | 2/2005 | Suzuki | 348/51 |
| 6,944,331 B2* | 9/2005 | Schmidt et al. | 382/165 |
| 6,963,425 B1* | 11/2005 | Nair et al. | 358/1.9 |
| 7,035,450 B1* | 4/2006 | Muller et al. | 382/154 |
| 7,039,229 B2* | 5/2006 | Lin et al. | 382/165 |
| 2003/0174891 A1* | 9/2003 | Wenzel et al. | 382/209 |

FOREIGN PATENT DOCUMENTS

| | | |
|---|---|---|
| WO | 99/23600 | 5/1999 |

OTHER PUBLICATIONS

Michael J. Swain and Dana H. Ballard "Color Indexing," International Journal of Computer Vision, 7:1, pp. 11-32, 1991.

Marie-Pierre Dubuisson and Anil K. Jain "Fusing Color and Edge Information for Object Matching," IEEE, pp. 982-986, 1994.

F. Kimura and M. Shridhar "Handwritten numerical recognition based on multiple algorithms" from: Pattern Recognition, vol. 24, Issue 10, 1991, Publisher: Elsevier Science Inc., New York, NY, pp. 969-983 (ISSN: 0031-3203).

* cited by examiner

PRIOR ART PATTERN MATCHING

PRIOR ART PATTERN MATCHING WITH
CHARACTERIZATION OF THE TEMPLATE IMAGE

PATTERN MATCHING USING MULTIPLE TECHNIQUES

FIELD OF THE INVENTION

The present invention relates to improved methods for performing pattern matching to locate one or more instances of a template image in a target image. More specifically, the invention includes a method for performing pattern matching using a plurality of pattern matching techniques.

DESCRIPTION OF THE RELATED ART

In many applications it is necessary or desired to find a template image, image object, or pattern in a target image. Such applications include machine vision applications for manufacturing test, inspection, process monitoring, feedback control, and laboratory automation; image and video compression; and jitter compensation in video cameras, among others.

Prior art pattern recognition systems have typically used a template matching technique wherein the stored image or pattern to be located, referred to as the template, is iteratively compared with various corresponding portions of an image in which it is desired to locate the template, referred to as the target image. FIG. 1 illustrates the pattern matching problem as known in the prior art. As shown, the pattern matching problem involves a template image, wherein one or more instances of the template image are desired to be located in the target image. The template image and the target image are provided to a pattern matching algorithm which performs the pattern matching. The pattern matching algorithm generally operates to compare the pixels in the template image, or a selected subset of sample pixels, against each of the possible various locations in the target image. Typically, the pattern matching algorithm involves comparing the template image, or a subset of sample pixels representing the template image, against locations in the target image on a horizontal pixel column basis and horizontal scan line basis. In other words, the sample pixels representing the template image are compared against a portion of the pixels in the target image, such as by using a 2D correlation, the sample pixels representing the template are then moved down or across a one pixel scan line or one pixel column in the target image, and the pattern matching algorithm is repeated, etc. Thus, the pattern matching algorithm generally involves comparing the template image pixels against all possible locations in the target image in an iterative fashion. The pattern matching produces the location of the template in the image, the quality of match and possibly the orientation, size and/or scaling of the template.

Generally, prior to performing the pattern matching algorithm, the pattern or template image may be characterized. FIG. 2 illustrates the pattern matching process of the prior art which involves characterization of the template image to extract features from the template image. In other words, the template is characterized to represent the template image with a lesser amount of data. For example, the template image may be characterized by sampling a number of points or pixels, referred to as sample pixels, which presumably accurately characterize the template image. The template image is characterized in this fashion because the time required for the pattern matching is generally directly proportional to the number of points or pixels representing the template image which are used in the pattern matching. Thus the template is characterized to reduce the number of samples or pixels which are used in the correlation operation, thereby reducing the amount of computation. Once a lesser number of sample pixels have been generated, these sample pixels are then used in the pattern matching algorithm to locate instances of the template image in the target image.

The template is compared with portions of the target image, for example, by utilizing a correlation based pattern matching, i.e., using normalized two dimensional correlation (normalized 2D correlation). This 2D correlation is performed by placing the template over the respective portion of the image and performing a normalized 2D correlation between the pixels in the template and the pixels in the corresponding portion of the image. This correlation generally produces a correlation value which indicates the degree of correlation or match. For example, the correlation value may range between −1 and +1, wherein +1 indicates a complete match, 0 indicates no match, i.e., that the two images are uncorrelated, and −1 indicates that the two images are anti-correlated, i.e., a complete reversal of a match.

Other pattern matching algorithms include geometric pattern matching, where particular geometric features of the template image are detected and characterized, then sought in the target image; color matching, where the color content of the template image is compared to that of various regions of the target image, irrespective of particular forms in the images; luminance pattern matching, where intensity information is used to perform correlation- and/or geometric-based pattern matching; and hue plane pattern matching, where hue plane information (color information) is used to perform correlation- or geometric-based pattern matching; as well as rotation invariant pattern matching techniques, among others.

For many applications, a particular pattern matching algorithm, or a particular group of pattern matching algorithms, may be more effective than other algorithms at finding a match, depending on the image data. As an example, for an image with colors whose hues are very different, but whose luminance or intensity values are similar, a luminance pattern matching algorithm may perform poorly, while a hue plane pattern matching algorithm may perform quite well.

However, in many situations it may not be possible to know beforehand which technique or group of techniques would be appropriate for a matching task. Therefore, an improved system and method is desired for finding a template image or image object in a larger target image.

SUMMARY OF THE INVENTION

The present invention comprises various embodiments of a system and method for performing pattern matching to locate zero or more instances of a template image in a target image. The pattern matching is preferably performed by one or more programs executing in a computer system. The target image is preferably acquired by the system, such as by a camera, and provided to the computer system for the pattern matching.

The pattern matching system and method of the present invention may be used in a variety of applications, such as, for example, a machine vision system. The machine vision system preferably comprises a host computer and a video source, e.g., a camera, which preferably produces a video signal comprising an image or a sequence of images or video frames, or other data desired to be acquired. The video signal is provided through a wire or cabling to the host computer for storage and/or processing. The host computer includes various standard components, such as at least one CPU, memory, etc.

The computer may receive the target image from an image source (e.g., a camera) and perform pattern matching using the stored template image. In other embodiments, the computer may receive the target image and/or the template image from another source, or one or both of the target image and the template image may be pre-stored on the computer.

The host computer receives and/or stores the template image or pattern, as well as software which performs pattern matching to locate zero or more instances of the template image in the target image. In some embodiments, the software may be executable to utilize a plurality of pattern matching techniques in the pattern matching operation, various embodiments of which are described below.

In one embodiment, first pattern matching may be performed on the image using a first pattern matching technique to determine a plurality of candidate areas. Then, second pattern matching may be performed on each of the candidate areas using a second different pattern matching technique to generate final pattern match results. The first and second pattern matching techniques may each be any of a variety of pattern matching techniques, provided that they differ from each other, including a geometric pattern matching technique, a correlation-based pattern matching technique, a color matching technique, a hue plane pattern matching technique, a luminance pattern matching technique, a rotation invariant pattern matching technique, or any other pattern matching technique, provided that the first and second pattern matching techniques are different. In another embodiment, at least one of the first pattern matching technique and the second pattern matching technique may use a hill-climbing technique.

In one embodiment, performing the first pattern matching may include generating a first pattern matching score for each of the plurality of candidate areas, where the pattern matching score is a measure of the degree to which the respective candidate area matches the pattern or template image. Determining the plurality of candidate areas may then be based on the first pattern matching scores. Similarly, performing second pattern matching may include generating a second pattern matching score for each of the plurality of candidate areas, where generating the final pattern match results may be based on the second pattern matching scores. In another embodiment, the final pattern match results may be determined based on both the first pattern matching scores and the second pattern matching scores.

In another embodiment, the first pattern matching technique may be a coarse or 'low resolution' pattern matching technique, and the second pattern matching technique may be a fine or 'high resolution' pattern matching technique. For example, the first pattern matching technique may include sub-sampling or under-sampling the template image and the target image, i.e., performing pattern matching on the image using a subset of the image pixels. Once the candidate areas have been determined by the first pattern matching technique, the second pattern matching technique may be applied to each candidate area, using all or substantially all of the image pixels in each candidate area, or using more samples than the coarse technique. In one embodiment, the second pattern matching technique may differ from the first pattern matching technique only in resolution. Thus, in one embodiment, each of the pattern matching techniques may be performed on the image with one or more of complete sampling, over-sampling, and under-sampling or sub-sampling. As is well known in the art, there are many ways in which an image may be sampled to efficiently extract features from the image. One example of an efficient approach to sub-sampling is sampling using a Low Discrepancy sequence.

Finally, an output may be generated indicating the final pattern match results. For example, the results may be stored in memory, output to an external system, and/or displayed on a display device, such as a computer monitor or printer.

In another embodiment, a plurality of pattern matching techniques may be applied to the image and the results analyzed to determine final match results, as described below.

A plurality of pattern matching operations (which may be referred to as the "first pattern matching") may be performed on the received image using a plurality of different pattern matching techniques. Two or more of the plurality of different pattern matching techniques may be performed concurrently or in parallel as discussed below. The first pattern matching may thereby determine a plurality of candidate areas for each of the plurality of different pattern matching techniques. The plurality of candidate areas produced by each of the plurality of different pattern matching techniques may then be analyzed to determine pattern match results.

In one embodiment, performing the first pattern matching on the image using a plurality of different pattern matching techniques may include calculating a matching score for each of the plurality of candidate areas. The matching scores may then be analyzed to determine the pattern match results. In one embodiment, the matching scores may be weighted according to the pattern matching technique used. For example, calculating a matching score for each of the plurality of candidate areas may include: for each respective candidate area of the plurality of candidate areas, calculating a raw score corresponding to each pattern matching technique, weighting each raw score according to the corresponding pattern matching technique, the sampling factor used, or other criteria, to generate a set of weighted scores for the respective candidate area, and generating a matching score based on the set of weighted scores.

In an exemplary embodiment, first pattern matching may be performed on the image using a first pattern matching technique to determine a first plurality of candidate areas, as described above. In addition, second pattern matching may be performed (possibly concurrently) on the image using a second different pattern matching technique to generate a second plurality of candidate areas. The first and second pattern matching techniques may each be any of a variety of pattern matching techniques, provided that they differ from each other, including a geometric pattern matching technique, a correlation-based pattern matching technique, a color matching technique, a hue plane pattern matching technique, a luminance pattern matching technique, a rotation invariant pattern matching technique, or any other pattern matching technique, provided that the first and second pattern matching techniques are different. The first and second pattern matching techniques may also be different versions or types of the same technique. For example, the first pattern matching technique may be a first type of geometric pattern matching technique, and the second pattern matching technique may be a second different type of geometric pattern matching technique. In another embodiment, at least one of the first pattern matching technique and the second pattern matching technique may use a hill-climbing technique. In this embodiment, the first and second pattern matching techniques may be performed at least partially concurrently, as described above.

The first plurality of candidate areas and the second plurality of candidate areas may then be analyzed to determine final pattern match results, for example, to determine one or more final candidate areas common to the first plurality of candidate areas and the second plurality of candidate areas.

In another embodiment, a pattern matching score may be generated by the two pattern matching techniques for each of the first plurality of candidate areas and for each of the second plurality of candidate areas, respectively. The analyzing may then include analyzing the pattern matching scores for each of the first plurality of candidate areas and the second plurality of candidate areas to generate the final pattern match results. For example, the common candidate areas may be culled based on the scores, discarding candidate areas whose scores fall below a threshold value. For another example, the two scores corresponding to each common candidate area may be combined to generate a final score for each common candidate area, and these final scores used to determine the final match results. In one embodiment, the scores may be combined in a weighted sum, where each score is weighted based on the particular pattern matching technique used to determine the candidate area (and to generate the score). In another embodiment, the analysis may include generating a 'vote' corresponding to each of the pattern matching techniques, where each vote indicates a best match candidate area for the respective technique. The votes may be tallied, and the candidate area receiving the most votes considered the best match.

In one embodiment, the method may further include performing third pattern matching on the image using a third different pattern matching technique to determine a third plurality of candidate areas. In this embodiment, the analyzing may also include analyzing the third plurality of candidate areas to determine final pattern match results. Thus, rather than just analyzing the first and second candidate areas to determine the final match results, the first, second, and third candidate areas may be analyzed as described above to determine the final match results.

Other embodiments are also contemplated where additional pattern matching is performed on the image using additional pattern matching techniques, thereby generating corresponding further candidate areas for analysis. The methods described herein may be generalized to any number of pattern matching methods or operations using any number of different techniques.

In one embodiment, first pattern matching may be performed on the image using a plurality of different pattern matching techniques, where the pattern matching determines a plurality of candidate areas for each of the plurality of different pattern matching techniques, as described above.

Then, the plurality of candidate areas produced by each of the plurality of different pattern matching techniques may be analyzed to determine a plurality of intermediate candidate areas. Various examples of this analysis are described above.

Second pattern matching may then be performed on each of the intermediate candidate areas using a high-resolution pattern matching technique, thereby generating pattern match results. In other words, a pattern matching technique may be used which requires greater resources and/or time to perform than each of the plurality of pattern matching techniques used in the first pattern matching. Thus, the plurality of pattern matching techniques may narrow the search areas to be searched by the more expensive (in terms of cycles and/or time) pattern matching technique, i.e., the high-resolution technique. It is noted that as used herein, the term "high-resolution" may refer to pixel resolution, number of calculations, or any other metric which characterizes the time and/or resources required to perform the pattern matching technique.

Finally, an output may be generated indicating the pattern match results, as described above.

In another embodiment, the first pattern matching may be performed on the image using a first pattern matching technique, thereby determining a first plurality of candidate areas. Second pattern matching may be performed on the image, or on each of the first plurality of candidate areas, using a second different pattern matching technique, thereby generating a second plurality of candidate areas. The first plurality of candidate areas and the second plurality of candidate areas may then be analyzed to determine a third plurality of candidate areas. In one embodiment, the third plurality of candidate areas may include candidate areas which are common to the first plurality of candidate areas and the second plurality of candidate areas. In another embodiment, a pattern matching score may be generated for each of the first plurality of candidate areas, and for each of the second plurality of candidate areas, where the pattern matching scores for each of the first plurality of candidate areas and the second plurality of candidate areas may be analyzed to generate the third plurality of candidate areas. For another example, the two scores corresponding to each common candidate area may be combined to generate a final score for each common candidate area, and these final scores used to determine the third plurality of candidate areas. Third pattern matching may then be performed on each of the third plurality of candidate areas using a third different pattern matching technique, thereby generating final pattern match results. In one embodiment, the first pattern matching and second pattern matching may each comprise coarse pattern matching, and the third pattern matching may comprises fine pattern matching.

In another embodiment, the first pattern matching may be used to determine the manner in which second pattern matching is performed. In one embodiment, the first pattern matching may comprise coarse or 'low resolution' pattern matching, and may determine a plurality of coarse candidate areas for each of the plurality of different pattern matching techniques. Then, the coarse candidate areas may be analyzed to determine selected one or more pattern matching techniques. The selected one or more pattern matching techniques may at least in part be based on a metric which indicates a desired characteristic of the selected pattern matching techniques.

In one embodiment, a user may specify a metric indicating desired pattern matching performance. The metric may be specified, for example, using a Graphical User Interface (GUI) control, where the GUI is presented to the user by a program executing on the computer system. The Graphical User Interface (GUI) control may include a slider control which is operable by the user to select a value indicating a degree of the desired characteristic.

For example, the metric may indicate a desired degree of speed for the subset of pattern matching techniques, or, the metric may indicate a desired degree of accuracy for the subset of pattern matching techniques. In one embodiment, the metric may indicate a desired degree of accuracy or speed for the subset of pattern matching techniques, where the accuracy and speed are inversely related. Thus, the GUI may present a slider control to the user which allows the user to select the degree to which speed, or inversely, accuracy, should be considered when selecting the subset of pattern matching techniques.

Second pattern matching may then be performed on each of the plurality of coarse candidate areas using the subset of pattern matching techniques determined above. The second pattern matching is preferably fine or 'high resolution' pattern matching, and so may determine one or more fine candidate areas for each of the subset of pattern matching techniques. The one or more fine candidate areas produced by each of the subset of pattern matching techniques may then be analyzed to determine final pattern match results, as described above.

In another embodiment, first pattern matching may be performed on the image using a first pattern matching technique, thereby determining a first plurality of candidate areas. Then, second pattern matching may be performed on the image using a second different pattern matching technique, thereby generating a second plurality of candidate areas.

Third pattern matching may then be performed on the first plurality of candidate areas using the second pattern matching technique to generate first pattern match results, and fourth pattern matching may be performed on the second plurality of candidate areas using the first pattern matching technique to generate second pattern match results. Thus the first and second pattern matching techniques are each applied to the results of the other respective technique.

In one embodiment, the first and second pattern matching may each comprise coarse pattern matching on the image, and the third and fourth pattern matching may each comprise fine pattern matching on the image.

The first match results and the second match results may then be analyzed to determine final pattern match results. In one embodiment, generating the first and second pattern match results may include generating third and fourth candidate areas, respectively, and so the third and fourth candidate areas may be analyzed as described above to determine final pattern match results.

In yet another embodiment, first pattern matching may be performed on an image, such as a test image, using a plurality of different pattern matching techniques, thereby determining one or more candidate areas for each of the plurality of different pattern matching techniques. The plurality of candidate areas produced by each of the plurality of different pattern matching techniques may be analyzed to select two or more of the pattern matching techniques from the plurality of pattern matching techniques. In one embodiment, the selection may be made based on a desired characteristic of a pattern matching task, such as, for example, match accuracy or speed/performance. Thus, the results of the first pattern matching using each of the plurality of pattern matching techniques may be analyzed to determine which two or more of the pattern matching techniques are most suitable for images of the first type. The selection may be made based on any of a variety of characteristics, including match scores, speed, and accuracy, among others. In one embodiment, where the image is a test image containing known matches that match to varying degrees, the method may select the two or more pattern matching techniques that produce the best results, i.e., that most accurately reflect the known matches. For example, the test image may contain one or more template instances or matches of varying degrees, and the selection may be based on which pattern matching techniques find the template instances, or which pattern matching techniques produce match scores which most closely match the expected scores from the test image.

As mentioned above, software executing on the computer system may present a Graphical User Interface (GUI) to the user which operates to receive user input specifying the desired characteristic prior to the analyzing. For example, the user may specify the desired characteristic using a GUI control, such as a slider control, whereby the user may select a value indicating a degree of the desired characteristic, as described above.

After the selection of two or more pattern matching techniques has been made, a plurality of images of the first type may be received. In other words, more images may be received which are of the same type as the image received above. Then, pattern matching may be performed on each of the plurality of images of the first type using the selected two or more of the pattern matching techniques, thereby generating pattern match results.

Finally, as described above, an output may be generated indicating the pattern match results.

In one embodiment, the first pattern matching may comprise coarse pattern matching, and may be performed on the image using the plurality of different pattern matching techniques to determine one or more coarse candidate areas for each of the plurality of different pattern matching techniques. Performing the coarse pattern matching may include generating a match score associated with each pattern matching technique for each coarse candidate area.

Best scores may be determined from the match scores, indicating best pattern matches. In this embodiment, the selection of the two or more pattern matching techniques may include selecting two or more pattern matching techniques from the plurality of different pattern matching techniques based on the best scores. In other words, a high match score may be the desired characteristic used to select the preferred pattern matching techniques.

In this embodiment, the method may then perform fine pattern matching on each of the plurality of coarse candidate areas using the selected pattern matching techniques to determine the one or more final match candidate areas, which may then be output, as described above.

In one embodiment, all or at least a portion of the various pattern matching operations may be performed contemporaneously, for example, using a multiprocessor computer system. As one example, a first pattern matching operation may be performed by one or more first processors, while a second pattern matching operation may be performed substantially concurrently by one or more second processors. Alternatively, a first pattern matching operation and a second pattern matching operation may execute concurrently in one or more programmable hardware elements, such as field programmable gate arrays (FPGAs). In another embodiment, the first and second pattern matching operations may be performed concurrently using one or more processors and one or more programmable hardware elements. In another embodiment, a first pattern matching operation may be performed by one or more first execution threads in a multi-threaded system, while a second pattern matching may be performed concurrently by one or more second execution threads in the multi-threaded system. In yet another embodiment, the computer system may include multiple computers coupled over a network, such as the Internet, where the first and second pattern matching operations are performed by respective different computers.

Thus, the systems and methods as described above may use a plurality of pattern matching techniques to detect a pattern or template image in a target image.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Incorporation by Reference

The following U.S. patents and patent applications are hereby incorporated by reference in their entirety as though fully and completely set forth herein.

U.S. patent application Ser. No. 09/832,912, titled "System and Method for Image Pattern Matching Using a Unified Signal Transform", filed on Apr. 10, 2001, whose inventors are Ram Rajagopal, Lothar Wenzel, Dinesh Nair and Darren Schmidt;

U.S. patent application Ser. No. 10/014,945, titled "System and Method for Performing Color Pattern Matching using Luminance and Hue Plane Matching", filed on Oct. 6, 2001, whose inventors are Darren R. Schmidt, Kevin L. Schultz, Siming Lin and Dinesh Nair; and U.S. patent application Ser. No. 10/005,548, titled "Locating Regions in a Target Image Using Color Match, Luminance Pattern Match and Hill-Climbing Techniques", filed on Oct. 26, 2001, and whose inventors are, Siming Lin, Dinesh Nair, and Darren R. Schmidt.

The following publications are hereby incorporated by reference as though fully and completely set forth herein.

"Numerical Recipes in Fortran 77: The Art of Scientific Computing" (ISBN 0-521-43064-X), Cambridge University Press, pgs. 299-306;

"State-of-the-Art in Shape Matching", by Remco C. Veltkamp and Michiel Hagedoorn, Utrecht University, Department of Computing Science, The Netherlands.

The present invention comprises various embodiments of a system and method for performing pattern matching. The pattern matching system and method of the present invention may be used in a number of different applications including various types of machine vision systems, e.g., industrial automation, robotic vision, or traffic analysis, and image or video compression, such as MPEG compression, among others.

The present invention also comprises various embodiments of a system and method for using multiple pattern matching techniques to detect a pattern in an image. This system and method for detecting a pattern in an image may also be used in a large number of different applications, such as pattern matching, image compression, video compression, archival of image data, etc.

As used herein, the term "pattern" refers to an image or a portion of an image that is desired to be located in a target or acquired image. The term "pattern" may also refer to a characteristic of an image or image portion.

Figure 1:
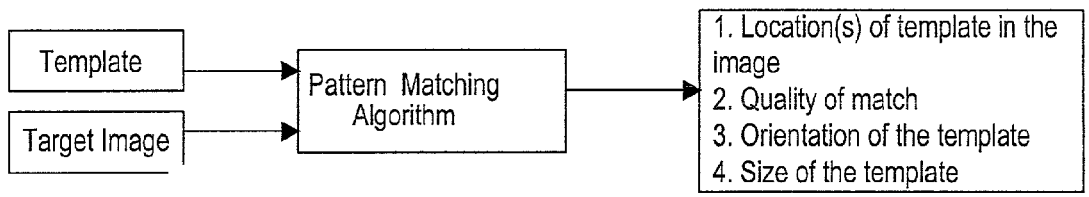
FIG. 1 illustrates pattern matching as performed in the prior art.
Figure 2:
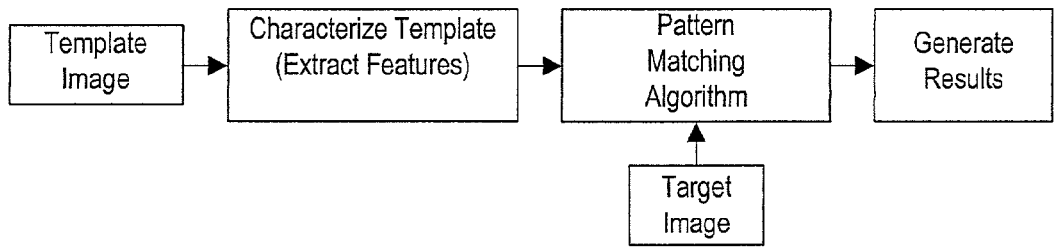
FIG. 2 illustrates pattern matching performed in the prior art.
Figure 3:
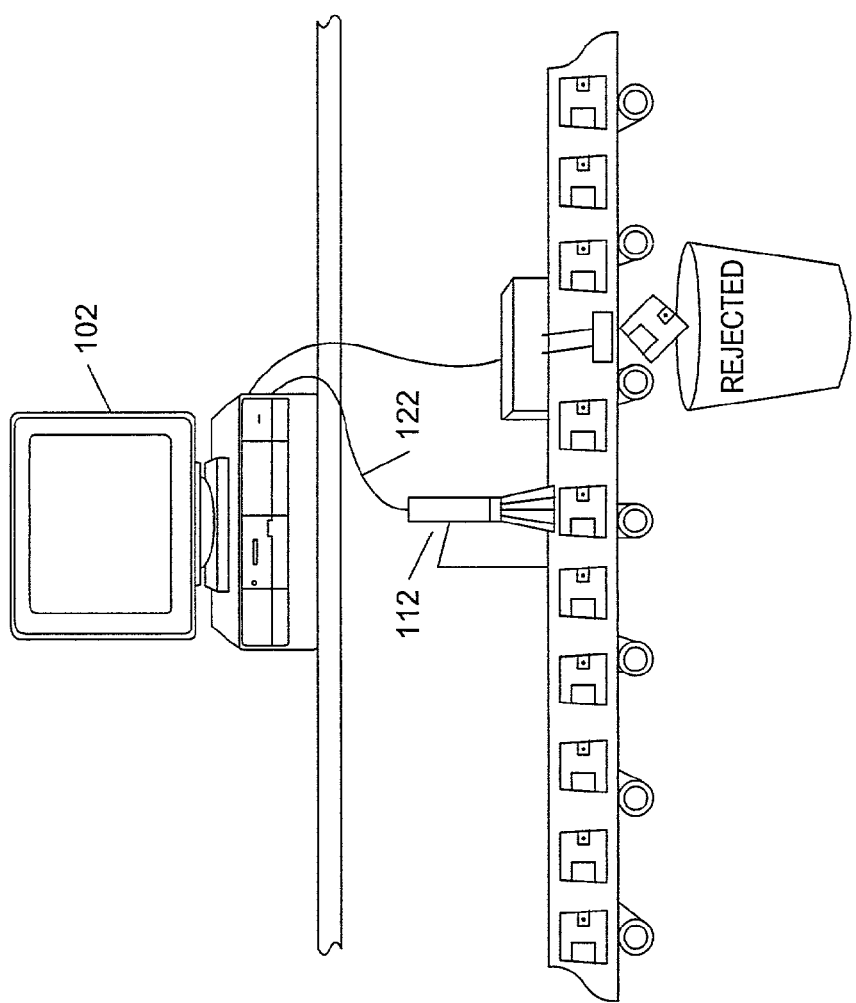
FIG. 3 illustrates a machine vision system according to one embodiment of the present invention.

FIG. 3—Machine Vision System

FIG. 3 illustrates an example of a machine vision application wherein the pattern matching system and method of the present invention may be used. The machine vision system may comprise a host computer 102 and a video source 112. The video source may be an analog or digital camera. The video source 112 preferably produces a digital video signal which comprises an image or a sequence of images or video frames, or other data desired to be acquired. The digital video signal may be provided through a wire or cabling 122 to the host computer 102 for storage and/or processing. The host computer may include an image acquisition or frame grabber board (also called a video capture board). The host computer 102 preferably includes various standard components, such as at least one CPU, memory, etc.

The host computer 102 may store a template image or pattern. In one embodiment, the host computer 102 may also store software which performs pattern matching to locate zero or more instances of the template image in the target image. According to one embodiment of the present invention, the software is executable to utilize a plurality of pattern matching techniques in the pattern matching operation, as will be described below.

In the embodiment of FIG. 3, the host computer 102 may receive the target image from the video source 112 and perform pattern matching using the stored template image. However, in other embodiments, the computer 102 may receive the target image and/or the template image from another source, or one or both of the target image and the template image may be pre-stored on the computer.

FIG. 3 illustrates a machine vision application, where the computer system 102 is coupled to a camera 112 and operates to receive a target image and perform pattern matching to locate one or more instances of a template image in the target image. The computer system of FIG. 3 is programmed according to one embodiment of the present invention to apply a plurality of pattern matching techniques to the target image to detect and locate the template image in the target image. The pattern matching and/or image characterization techniques of the present invention may be used in various types of machine vision applications. For example, the computer 102 may be embodied in various form factors and/or architectures, e.g., a robot, among others. It is also noted that the pattern matching and/or image characterization techniques of the present invention may be performed in any of various manners, either in software, programmable logic, or hardware, or a combination thereof.

Figure 4:
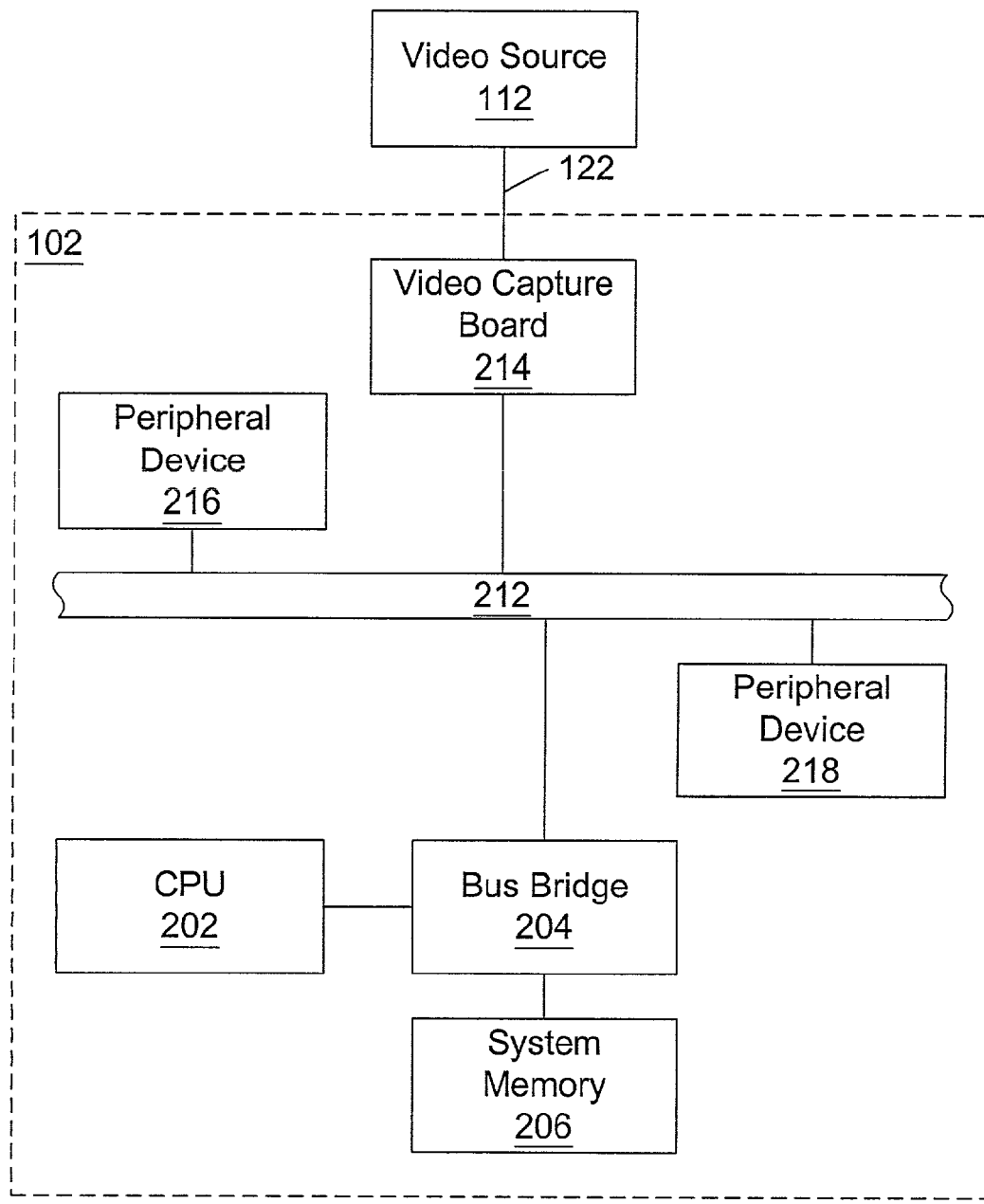
FIG. 4 is a high-level block diagram of the machine vision system.

FIG. 4—Video Capture System Block Diagram

FIG. 4 is a high-level block diagram of the video capture system of FIG. 3. It is noted that the block diagram of FIG. 4 is exemplary only, and other computer system architectures may be used as desired. For example, embodiments of the present invention may be implemented in a "smart camera", for example, which integrates a sensor, analog to digital (A/D) converter, CPU and communications devices together in a single unit. The present invention may be embodied in other architectures or embodiments, as desired.

As shown in FIG. 4, the host computer 102 preferably comprises a CPU 202, a Bus Bridge 204, system memory 206, and a peripheral bus 212. The CPU 202 is coupled to the Bus Bridge 204. The Bus Bridge 204 is coupled to the system memory 206 and the CPU 202, and couples to the peripheral bus 212. In the preferred embodiment, the peripheral bus 212 is the PCI expansion bus, although that other types of buses may be used.

In this embodiment, the host computer system 102 also includes a video capture board 214 which is adapted for coupling to the video source 112. The video capture board 214 is preferably coupled to the peripheral bus 212. In addition to the video capture board 214, other peripheral devices (216 and 218) may be coupled to the peripheral bus 212, such as audio cards, modems, graphics cards, network cards, etc.

The video source 112 supplies the video signals to the video capture board 214. The video capture board 214 transfers the digitized video frames to the system memory 206 through peripheral bus 212 and Bus Bridge 204. In this embodiment, the video capture board 214 acquires the target image and transfers the target image to system memory 206. Thus, the computer system 102 includes an input which is operable to receive image data.

The system memory 206 preferably stores a template image or pattern. The system memory 206 also preferably stores software according to one embodiment of the present invention which operates to use a plurality of pattern matching techniques to detect and locate instances of the pattern in the target image.

Embodiments of the present invention are preferably implemented in one or more software programs which are executable by one or more processors or CPUs. The software program(s) of the present invention are preferably stored in a memory medium. As used herein, the term "memory medium" is intended to include an installation media, e.g., a CD-ROM, DVD, or floppy disks, a computer system memory such as DRAM, SRAM, EDO RAM, etc., or a non-volatile memory such as a magnetic medium, e.g., a hard drive, or optical storage, among other types of memory.

In another embodiment, the methods presented herein may be performed by programmable hardware, such as a field programmable gate array (FPGA). In other embodiments, the methods may be performed by a combination of one or more processors and one or more programmable hardware elements.

Figure 5:
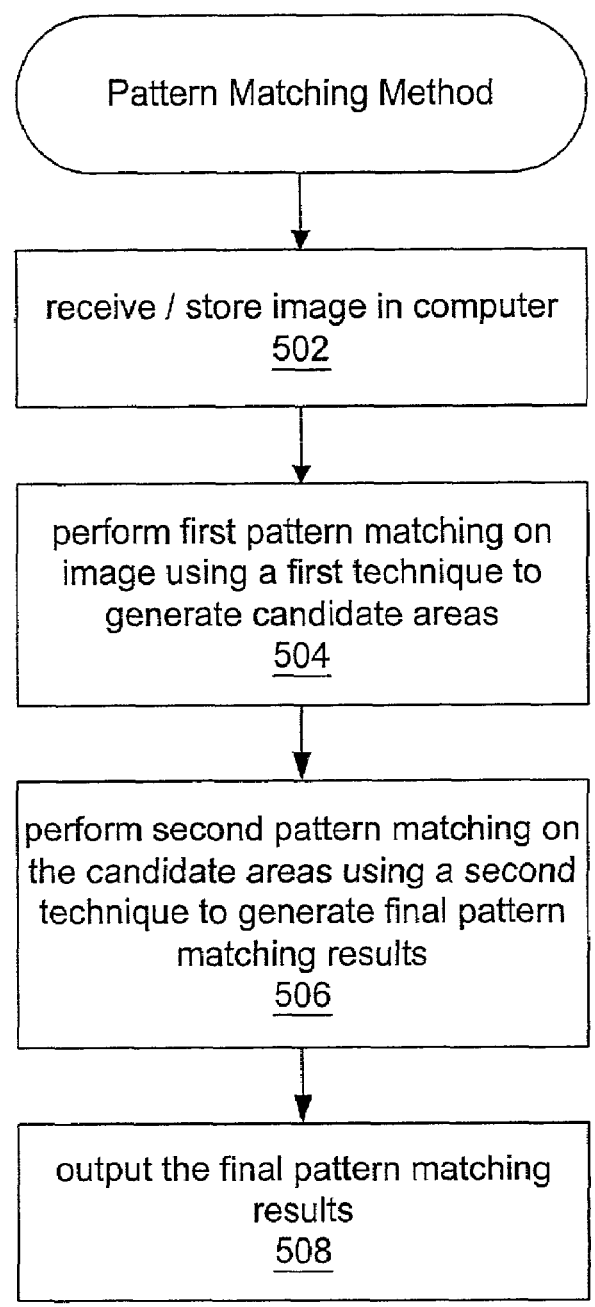
FIG. 5 is a flowchart diagram illustrating a first embodiment of a pattern matching method according to one embodiment of the present invention.

FIG. 5—Pattern Matching Flowchart: First Embodiment

FIG. 5 is a flowchart diagram illustrating a method for performing pattern matching according to one embodiment of the present invention. More specifically, the method uses a plurality of pattern matching techniques to detect a pattern or template image in a target image. It is noted that in various embodiments, some of the steps may be performed in a different order than shown or may be omitted, as desired. Additional steps may also be performed.

As shown, in 502 the image, i.e., the target image, may be received by and/or stored in the computer system. The image may be received from any of various sources, as desired, including an image source coupled to the computer system over a network. It is noted than in other embodiments, the image may already be present in the computer system, and thus step 502 may be omitted. In this embodiment, the pattern (template image) is already stored in the computer system, although in other embodiments the pattern or template image may be received prior to or after reception of the target image.

In 504 first pattern matching may be performed on the image using a first pattern matching technique to determine a first plurality of candidate areas.

Additionally, in 506 second pattern matching may be performed on each of the first plurality of candidate areas using a second different pattern matching technique to generate final pattern match results. In various embodiments, the first and second pattern matching techniques may each be any of a variety of pattern matching techniques, provided that they differ from each other.

For example, in one embodiment, the first pattern matching technique may be a geometric pattern matching technique. Consequently, in this embodiment, the second pattern matching technique may be any pattern matching technique which differs from the geometric pattern matching technique used in the first pattern matching, e.g., a correlation-based pattern matching technique or a different type of geometric pattern matching technique. In another embodiment, the first pattern matching technique may be a correlation-based pattern matching technique. Consequently, in this embodiment, the second pattern matching technique may be any different pattern matching technique, e.g., a geometric pattern matching technique. Thus, in one embodiment, the first pattern matching technique may be a correlation-based pattern matching technique, and the second pattern matching technique may be a geometric pattern matching technique. In another embodiment, the first pattern matching technique may be a first type of correlation-based technique, and the second pattern matching technique may be a second, different type of correlation-based technique. The first and second pattern matching techniques may also be different versions or types of the same technique. For example, the first pattern matching technique may be a first type of geometric pattern matching technique, and the second pattern matching technique may be a second different type of geometric pattern matching technique. Further examples of first and second pattern matching techniques are presented below, although it is noted that these examples are meant to be illustrative, and are not intended to limit the pattern matching techniques used to those described.

As one example, the first pattern matching technique may be a color matching technique, and the second pattern matching technique may be a geometric pattern matching technique. As another example, the first pattern matching technique may be a color matching technique, and the second pattern matching technique may be a hue plane pattern matching technique. Conversely, the first pattern matching technique may be a hue plane pattern matching technique, and the second pattern matching technique may be a color matching technique.

More generally, in one embodiment, the first pattern matching technique and the second pattern matching technique may each be one of a hue plane pattern matching technique, a color matching technique, a correlation-based pattern matching technique, a geometric pattern matching technique, and a luminance pattern matching technique, where, as mentioned above, the first pattern matching technique is a different technique from the second pattern matching technique. It is noted that these pattern matching techniques are meant to be exemplary only, and are not intended to limit the particular pattern matching techniques used in any of the embodiments of the invention. For example, in other embodiments, rotation invariant pattern matching may be performed by sampling the template image along one or more rotationally invariant paths, preferably circular perimeters, to produce one or more sets of sample pixels. These sample pixels from the circular paths may then be used in the pattern matching.

Other pattern matching techniques also contemplated include sampling based on low discrepancy sequences, sampling based on low discrepancy curves, as well as using hill-climbing algorithms in the pattern match search. For further information regarding pattern matching techniques, please see "State-of-the-Art in Shape Matching", by Remco C. Veltkamp and Michiel Hagedoorn, Utrecht University, Department of Computing Science, as well as U.S. patent application Ser. No. 09/832,912, titled "System and Method for Image Pattern Matching Using a Unified Signal Transform", U.S. patent application Ser. No. 10/014,945, titled "System and Method for Performing Color Pattern Matching using Luminance and Hue Plane Matching", and U.S. patent application Ser. No. 10/005,548, titled "Locating Regions in a Target Image Using Color Match, Luminance Pattern Match and Hill-Climbing Techniques", each of which was incorporated by reference above.

For more information on low discrepancy sequences, please see "Numerical Recipes in Fortran 77: The Art of Scientific Computing" (ISBN 0-521-43064-X) Cambridge University Press, pgs. 299-306, which was incorporated by reference above.

In one embodiment, performing first pattern matching may include generating a first pattern matching score for each of the plurality of candidate areas, where the pattern matching score is a measure of the degree to which the respective candidate area matches the pattern or template image. In this embodiment, determining the plurality of candidate areas may be based on the first pattern matching scores. Similarly, performing second pattern matching may include generating a second pattern matching score for each of the plurality of candidate areas, where generating the final pattern match results may be based on the second pattern matching scores. In another embodiment, the final pattern match results may be determined based on both the first pattern matching scores and the second pattern matching scores.

In one embodiment, performing second pattern matching on each of the first plurality of candidate areas may include performing second pattern matching on each candidate area and on the area proximate to the candidate area. In other words, performing pattern matching on a candidate area may also include applying the pattern matching technique to an area surrounding the candidate area.

In another embodiment, the first pattern matching technique may be a coarse pattern matching technique, and the second pattern matching technique may be a fine pattern matching technique. In one embodiment, the second pattern matching technique may differ from the first pattern matching technique only in resolution. For example, the first pattern matching technique may include sub-sampling the template image and the target image, i.e., performing pattern matching on the image using a subset of the image pixels. Once the candidate areas have been determined by the first pattern matching technique, the second pattern matching technique may be applied to each candidate area using all or substantially all of the image pixels in each candidate area. Thus, the first pattern matching technique may be a 'low resolution' technique which may be performed relatively quickly, while the second pattern matching technique may be a 'high resolution' technique, requiring more time or cycles to perform.

In one embodiment, performing second pattern matching on each of the first candidate areas using a second different pattern matching technique may include generating a second plurality of candidate areas, where the second plurality of candidate areas comprise a subset of the first plurality of candidate areas. The second plurality of candidate areas may then be analyzed to determine the final pattern match results. For example, one or more best matches may be selected from the second plurality of candidate areas. The final match results may then comprise these best match candidate areas.

In another embodiment, both the first and second pluralities of candidate areas may be analyzed to determine the final match results. For example, it may be the case that a candidate area determined by the first pattern matching technique matches so closely that even if it is not included in the second plurality of candidate areas, it may still be considered a match, and therefore may be included in the final match results.

In one embodiment, at least a portion of the second pattern matching may be performed contemporaneously with the first pattern matching. For example, when a first candidate area of the first plurality of candidate areas has been generated by the first pattern matching, the second pattern matching may begin processing the first candidate area while the first pattern matching continues generating subsequent candidate areas of the first plurality of candidate areas. In other words, as the first pattern matching generates each of the first plurality of candidate areas, the second pattern matching may proceed, applying the second pattern matching technique to the generated candidate areas as they are generated by the first pattern matching. Thus, the second pattern matching may be performed on the first candidate area, while the first pattern matching is generating the second, or subsequent, candidate areas of the first plurality of candidate areas, and so on, such that as each of the first plurality of candidate areas is generated by the first pattern matching, they are "passed" to the second pattern matching process for processing. Said another way, the first pattern matching and the second pattern matching may be "pipelined" to achieve a measure of concurrency. As used herein, the term "contemporaneously" includes substantially or partly contemporaneously. Similarly, as used herein, the term "concurrently" includes substantially or partly concurrently.

In one embodiment, the second pattern matching may be performed concurrently with the first pattern matching using a multiprocessor computer system. For example, the first pattern matching may be performed by one or more first processors, while the second pattern matching may be performed by one or more second processors, where the one or more first processors and the one or more second processors operate concurrently, or at least partly concurrently.

In one embodiment, the second pattern matching may be performed concurrently with the first pattern matching using a plurality of programmable hardware elements, such as field programmable gate arrays (FPGAs). In another embodiment, the second pattern matching may be performed concurrently with the first pattern matching using one or more processors and one or more programmable hardware elements.

In another embodiment, the first pattern matching may be performed by one or more first execution threads in a multi-threaded system, while the second pattern matching may be performed by one or more second execution threads in the multi-threaded system.

In yet another embodiment, the computer system may include multiple computers coupled over a network, such as the Internet, where the first pattern matching is performed by one or more first computers, and the second pattern matching is performed by one or more second computers concurrently.

It is noted that in further embodiments, successive different pattern matching techniques may be applied respectively to successive pluralities of candidate areas, where the application of each pattern matching technique culls the respective plurality of candidate areas to generate a successive plurality of candidate areas. Thus, the first plurality of candidate areas may be successively refined (culled or filtered) by repeated pattern matching using a succession of different pattern matching techniques.

Finally, in 508, an output may be generated indicating the final pattern match results. For example, the results may be stored in memory, output to an external system, and/or displayed on a display device, such as a computer monitor or printer.

Figure 6A:
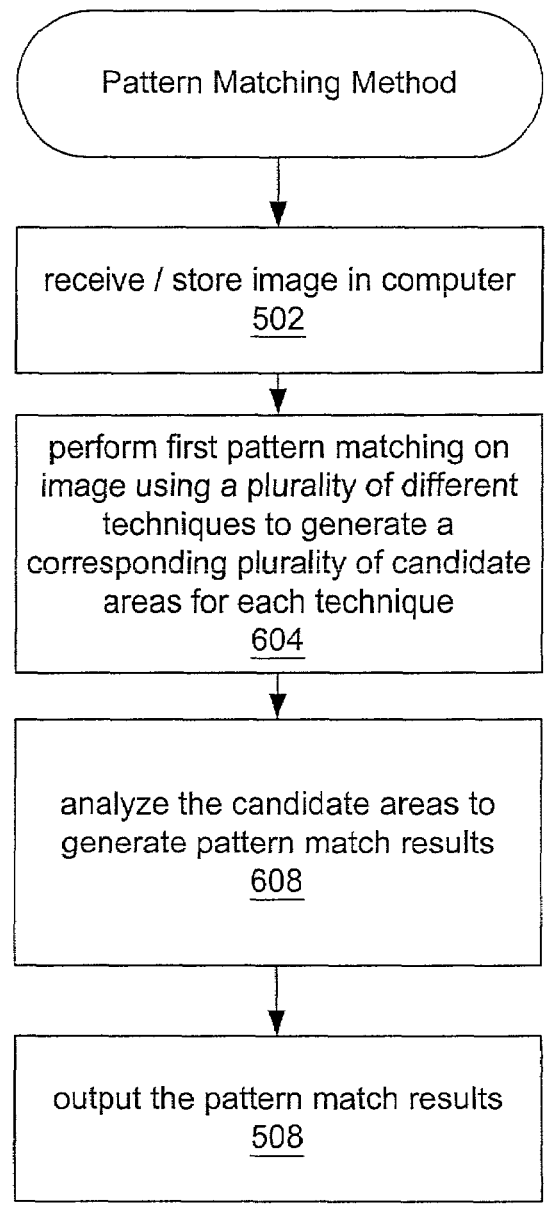
FIGS. 6A and 6B are flowchart diagrams illustrating a second embodiment of a pattern matching method according to one embodiment of the present invention.
Figure 6B:
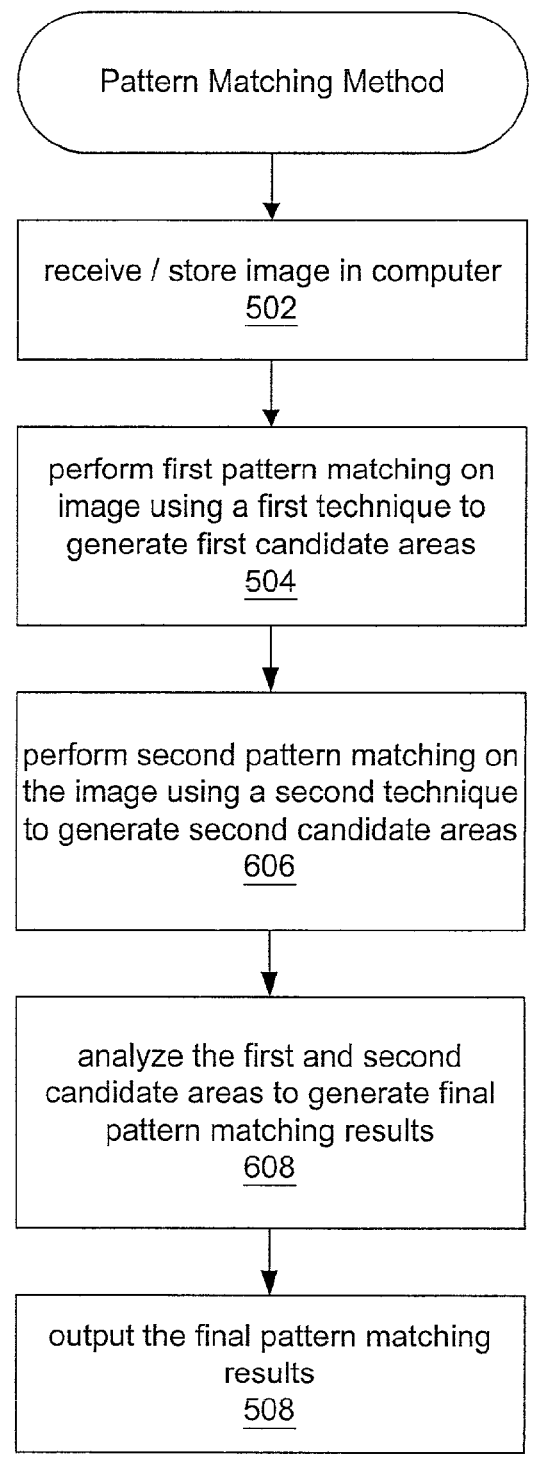

FIGS. 6A and 6B—Pattern Matching Flowchart: Second Embodiment

FIGS. 6A and 6B are flowchart diagrams illustrating a method for performing pattern matching according to another embodiment of the present invention. The method uses multiple pattern matching techniques to detect a pattern or template image in a target image. As mentioned above, in various embodiments, some of the steps may be performed in a different order than shown or may be omitted, as desired. Additional steps may also be performed.

FIG. 6A illustrates an embodiment in which a plurality of pattern matching techniques are performed on an image, and the results analyzed to determine pattern matching results, as described below.

As shown, in 502 the image, i.e., the target image, may be received by and/or stored in the computer system, as described above with reference to FIG. 5.

In 604, pattern matching (also referred to as first pattern matching) may be performed on the image using a plurality of different pattern matching techniques, where the pattern matching determines a plurality of candidate areas for each of the plurality of different pattern matching techniques. As mentioned above, any of a variety of different pattern matching techniques may be used to perform the pattern matching, including hue plane pattern matching, color matching, correlation-based pattern matching, geometric pattern matching, and a luminance pattern matching, among others.

In one embodiment, all or at least a portion of the pattern matching may be performed contemporaneously, as described above with reference to FIG. 5. For example, various of the pattern matching techniques may be performed concurrently using a multiprocessor computer system, a plurality of programmable hardware elements, such as FPGAs, or a combination of both. In another embodiment, the pattern matching techniques may be performed by two or more execution threads in a multi-threaded system, or by multiple computers coupled over a network, such as the Internet, where the pattern matching techniques are performed in a concurrent, or at least substantially concurrent manner.

In 608, the plurality of candidate areas produced by each of the plurality of different pattern matching techniques may be analyzed to determine pattern match results. In one embodiment, analyzing the each of the plurality of candidate areas may include determining one or more final candidate areas which are common to two or more of the pluralities of candidate areas, where the final pattern match results include the one or more final candidate areas.

In another embodiment, the method may include generating a pattern matching score for each of the candidate areas in each plurality of candidate areas, where the analyzing includes analyzing the pattern matching scores to generate the final pattern match results. Thus, if a candidate area were common to three different pluralities of candidate areas corresponding to three different pattern matching techniques, the candidate area would have three different pattern match scores. In one example, the common candidate areas mentioned above may be culled based on the scores, discarding candidate areas whose scores fall below a threshold value. For another example, the plurality of scores corresponding to each common candidate area may be combined to generate a final score for each common candidate area, and these final scores used to determine the final match results. In one embodiment, the scores may be combined in a weighted sum, where each score is weighted based on the particular pattern matching technique used to determine the candidate area (and to generate the score). For example, calculating a matching score for each of the plurality of candidate areas may include: for each respective candidate area of the plurality of candidate areas, calculating a raw score corresponding to each pattern matching technique, weighting each raw score according to the corresponding pattern matching technique to generate a set of weighted scores for the respective candidate area, and generating a matching score based on the set of weighted scores.

In another embodiment, the analysis may include generating a 'vote' corresponding to each of the pattern matching techniques, where each vote indicates a best match candidate area for the respective technique. The votes may be tallied, and the candidate area receiving the most votes considered the best match.

Finally, in 508, an output may be generated indicating the pattern match results, as described above.

FIG. 6B illustrates another version of the method of FIG. 6A, where a first pattern matching technique and a second pattern matching technique are performed on an image, and the results analyzed to determine pattern matching results, as described below.

As shown, in 502 the image, i.e., the target image, may be received by and/or stored in the computer system. As described above with reference to FIG. 5, the image may be received from any of various sources, including an image source coupled to the computer system over a network, or the image may be pre-stored in the computer system, and so step 502 may be omitted. As also mentioned above, the pattern (template image) may already be stored in the computer system, or may be received prior to or after reception of the target image.

In 504 first pattern matching may be performed on the image using a first pattern matching technique, thereby determining a first plurality of candidate areas.

Then, in 606 second pattern matching may be performed on the image using a second different pattern matching technique, thereby generating a second plurality of candidate areas. As mentioned above with reference to FIG. 5, the first and second pattern matching techniques may include any pattern matching techniques operable to detect a pattern in an image, provided that the first and second pattern matching techniques are different.

In one embodiment, the second pattern matching may be performed contemporaneously with the first pattern matching, as described above with reference to FIG. 5. In other words, while the first pattern matching generates the first plurality of candidate areas, the second pattern matching may generate the second plurality of candidate areas, thus increasing the performance of the method.

In 608, the first plurality of candidate areas and the second plurality of candidate areas may be analyzed to determine final pattern match results, as described above with reference FIG. 6A.

Finally, in 508, an output may be generated indicating the final pattern match results, as described above with reference to FIG. 5.

As also described above with reference to FIG. 5, in various embodiments, the first and second pattern matching techniques may each be one of a hue plane pattern matching technique, a color matching technique, a correlation-based pattern matching technique, a geometric pattern matching technique, and a luminance pattern matching technique, where the first pattern matching technique is a different technique from the second pattern matching technique. In one embodiment, the first pattern matching technique may be a coarse pattern matching technique, and the second pattern matching technique may be a fine pattern matching technique, as described above. In another embodiment, at least one of the first pattern matching technique and the second pattern matching technique may use a hill-climbing technique. As also mentioned above, other pattern matching techniques are also contemplated, the above list of pattern matching techniques being but examples of techniques suitable for use in the present invention.

In one embodiment, the method may further include performing third pattern matching on the image using a third different pattern matching technique to determine a third plurality of candidate areas. In this embodiment, the analyzing may also include analyzing the third plurality of candidate areas to determine final pattern match results. Thus, rather than just analyzing the first and second candidate areas to determine the final match results, the first, second, and third candidate areas may be analyzed as described above to determine the final match results.

In one example of this embodiment, the first pattern matching technique, the second pattern matching technique, and the third pattern matching technique may each be one of a hue plane pattern matching technique, a color matching technique, a correlation-based. pattern matching technique, a geometric pattern matching technique, and a luminance pattern matching technique, where the first pattern matching technique, the second pattern matching technique, and the third pattern matching technique are different.

Other embodiments are also contemplated where additional pattern matching is performed on the image using additional pattern matching techniques, thereby generating corresponding further candidate areas for analysis.

Figure 7A:
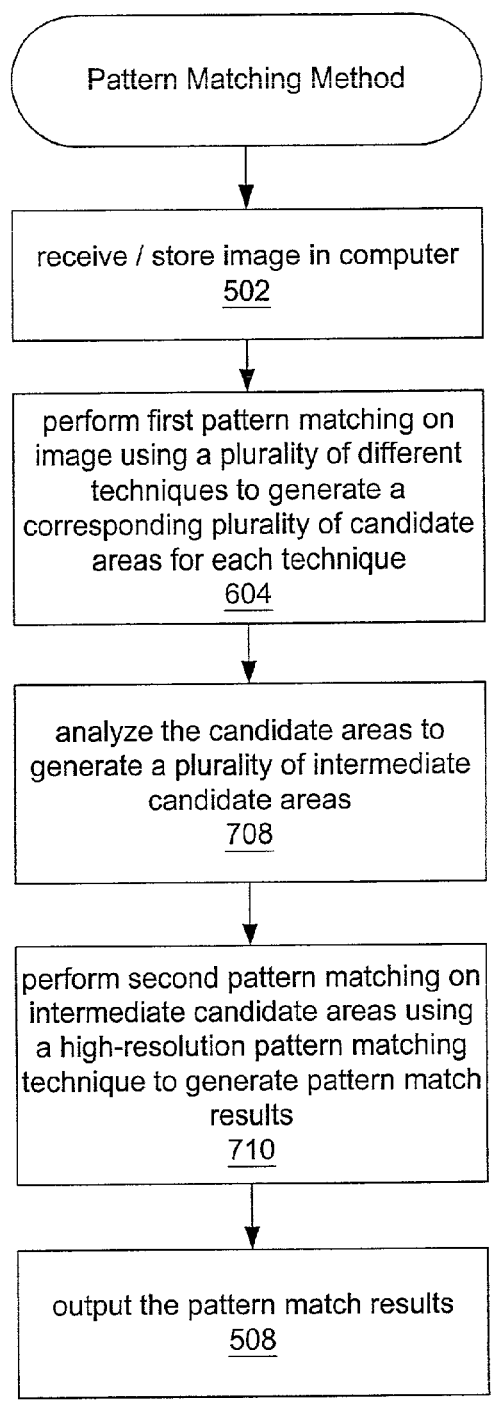
FIGS. 7A-7C are flowchart diagrams illustrating a third embodiment of a pattern matching method according to one embodiment of the present invention.
Figure 7B:
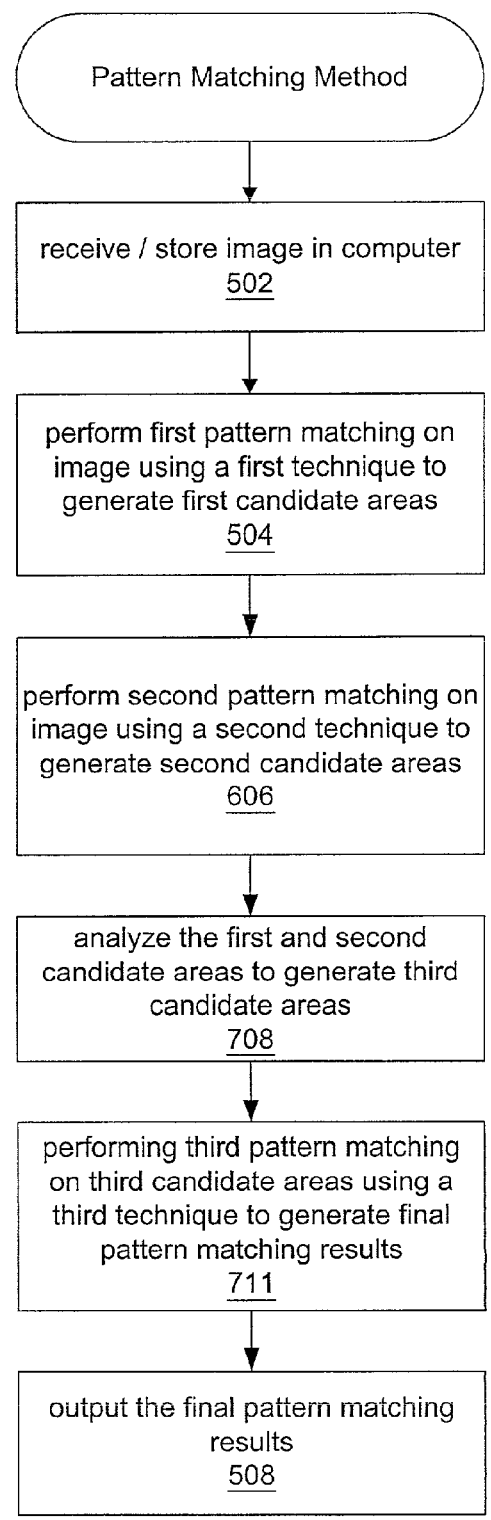
Figure 7C:
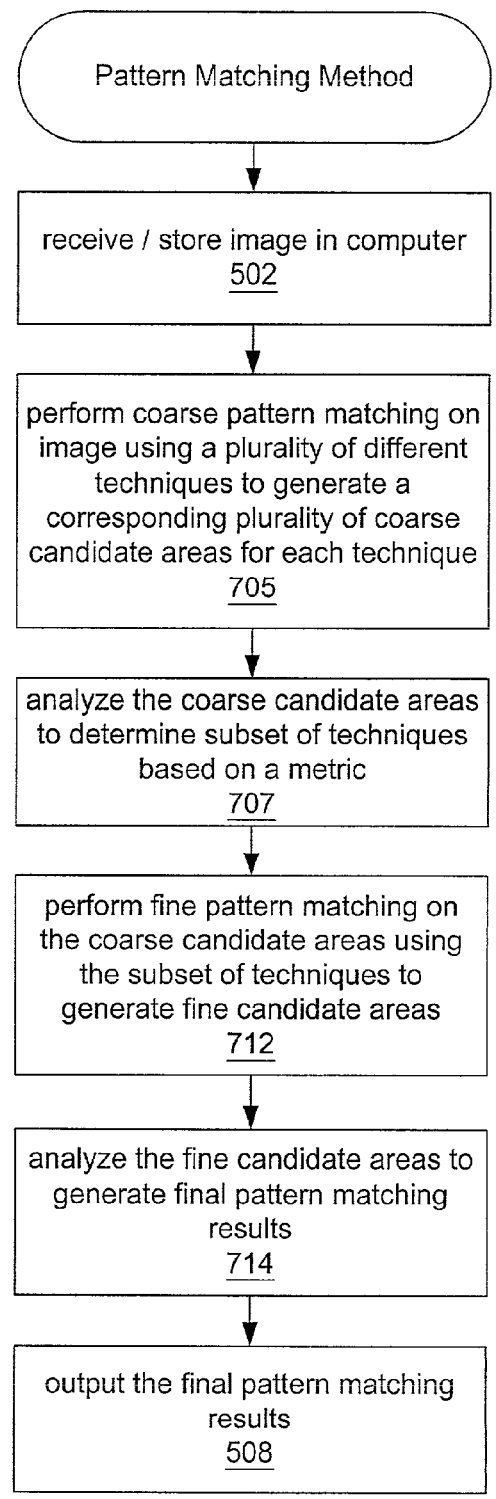

FIGS. 7A–7C—Pattern Matching Flowchart: Third Embodiment

FIGS. 7A through 7C are flowchart diagrams illustrating embodiments of a method for performing pattern matching using multiple pattern matching techniques to detect a pattern or template image in a target image. As mentioned above, in various embodiments, some of the steps may be performed in a different order than shown or may be omitted, as desired. Additional steps may also be performed. Descriptions of steps which are substantially the same as corresponding steps of FIGS. 5 and 6 may be abbreviated.

FIG. 7A illustrates a variant of the method described above with reference to FIG. 6A.

As shown in FIG. 7A, in 502 the image, i.e., the target image, may be received by and/or stored in the computer system, as described above with reference to FIG. 5.

In 604, pattern matching (also referred to as first pattern matching) may be performed on the image using a plurality of different pattern matching techniques, where the pattern matching determines a plurality of candidate areas for each of the plurality of different pattern matching techniques, as described above with reference to FIG. 6A.

Then, in 708, the plurality of candidate areas produced by each of the plurality of different pattern matching techniques may be analyzed to determine a plurality of intermediate candidate areas. Various examples of such analyses are described above in step 608 of FIG. 6A.

In 710, second pattern matching may be performed on each of the intermediate candidate areas using a high-resolution pattern matching technique, thereby generating pattern match results. In other words, a pattern matching technique may be used which requires greater resources and/or time to perform than each of the plurality of pattern matching techniques used in 704. Thus, the plurality of pattern matching techniques used in 704 may narrow the search areas to be searched by the more expensive (in terms of cycles and/or time) pattern matching technique, i.e., the high-resolution technique. It is noted that as used herein, the term "high-resolution" may refer to pixel resolution, number of calculations, or any other metric which characterizes the time and/or resources required to perform the pattern matching technique.

Finally, in 508, an output may be generated indicating the pattern match results, as described above.

FIG. 7B is a flowchart diagram illustrating a method for performing pattern matching using three different pattern matching techniques, as described below.

As FIG. 7B shows, in 502 the image may be received by and/or stored in the computer system, as described above with reference to FIG. 5.

In 504 first pattern matching may be performed on the image using a first pattern matching technique, thereby determining a first plurality of candidate areas, as also described above.

Then, in 606 second pattern matching may be performed on the image using a second different pattern matching technique, thereby generating a second plurality of candidate areas, as described above in reference to FIG. 6B. As also mentioned above, the first and second pattern matching techniques may include any pattern matching techniques operable to detect a pattern in an image, provided that the first and second pattern matching techniques are different.

As described above, in one embodiment, all or at least a portion of the second pattern matching may be performed contemporaneously with the first pattern matching. For example, the second pattern matching may be performed concurrently with the first pattern matching using a multi-processor computer system, a plurality of programmable hardware elements, such as FPGAs, or any combination thereof. In another embodiment, the first pattern matching may be performed by one or more first execution threads in a multi-threaded system, while the second pattern matching may be performed by one or more second execution threads in the multi-threaded system. In yet another embodiment, the computer system may include multiple computers coupled over a network, such as the Internet, where the first pattern matching is performed by one or more first computers, and the second pattern matching is performed by one or more second computers.

In 708, the first plurality of candidate areas and the second plurality of candidate areas may be analyzed to determine a third plurality of candidate areas, similar to the analysis described above with reference to FIG. 7A. In one embodiment, analyzing the first plurality of candidate areas and the second plurality of candidate areas may include determining two or more candidate areas which are common to the first plurality of candidate areas and the second plurality of candidate areas, where the third plurality of candidate areas includes the two or more common candidate areas.

In another embodiment, the method may include generating a pattern matching score for each of the first plurality of candidate areas, and for each of the second plurality of candidate areas, where the analyzing includes analyzing the pattern matching scores for each of the first plurality of candidate areas and the second plurality of candidate areas to generate the third plurality of candidate areas. For example, the common candidate areas mentioned above may be culled based on the scores, discarding candidate areas whose scores fall below a threshold value, where the remaining common candidate areas comprise the third plurality of candidate areas. For another example, the two scores corresponding to each common candidate area may be combined to generate a final score for each common candidate area, and these final scores used to determine the third plurality of candidate areas. In one embodiment, the scores may be combined in a weighted sum, where each score is weighted based on the particular pattern matching technique used to determine the candidate area (and to generate the score).

In 711, third pattern matching on each of the third plurality of candidate areas may be performed using a third different pattern matching technique, thereby generating final pattern match results. The generation of the final pattern match results may include any of various analyses, as described above, e.g., calculating match scores for each candidate area, selecting one or more best matches based on the scores, etc.

In one embodiment, the first pattern matching and second pattern matching may each comprise coarse pattern matching, and the third pattern matching may comprise fine pattern matching.

Finally, in 508, an output may be generated indicating the final pattern match results, as described above with reference to FIG. 5.

FIG. 7C flowcharts another variant of the method of FIG. 6A, in which first pattern matching is used to determine the manner in which second pattern matching is performed.

As FIG. 7C shows, after receiving the image in 502 as described above, first pattern matching may be performed on the image using a plurality of different pattern matching techniques, as described above. In a preferred embodiment, the first pattern matching comprises coarse pattern matching, and determines a plurality of coarse candidate areas for each of the plurality of different pattern matching techniques, as indicated in 705.

Then, in 707, the coarse candidate areas may be analyzed to determine a subset of the plurality of pattern matching techniques based on a metric. In one embodiment, the metric may indicate a desired characteristic of the subset of pattern matching techniques. In one embodiment, a user may specify the metric. For example, the user may specify the metric using a Graphical User Interface (GUI) control, where the GUI is presented to the user by a program executing on the computer system. In one embodiment, the Graphical User Interface (GUI) control may include a slider control which is operable by the user to select a value indicating a degree of the desired characteristic.

For example, in one embodiment, the metric may indicate a desired degree of speed for the subset of pattern matching techniques. In another embodiment, the metric may indicate a desired degree of accuracy for the subset of pattern matching techniques. In one embodiment, the metric may indicate a desired degree of accuracy or speed for the subset of pattern matching techniques, where the accuracy and speed are inversely related. Thus, in one embodiment, the GUI may present a slider control to the user which allows the user to select the degree to which speed, or inversely, accuracy, should be considered when selecting the subset of pattern matching techniques. For example, the slider control's left-most position may indicate that accuracy is the desired characteristic of the pattern match, and, conversely, the slider control's right-most position may indicate that speed is the desired characteristic of the pattern match. Intermediate positions may thus indicate corresponding degrees of accuracy/speed desired in the subset of pattern matching techniques.

In 712, second pattern matching may be performed on each of the plurality of coarse candidate areas using the subset of pattern matching techniques determined in 707. The second pattern matching is preferably fine pattern matching, and so may determine one or more fine candidate areas for each of the subset of pattern matching techniques. Thus, the first or coarse pattern matching may be performed at a 'low resolution', and thus may be performed relatively quickly, while the second or fine pattern matching may be performed at a 'high resolution', requiring more time or cycles to perform. Thus, the coarse pattern matching may be used to generate an initial set of candidate areas (the coarse candidate areas) which may not only narrow the scope of the subsequent fine matching search, but which may also be used to narrow the type and number of pattern matching techniques to be brought to bear on the target image, i.e., on the coarse candidate areas.

In 714, the one or more fine candidate areas produced by each of the subset of pattern matching techniques may be analyzed to determine final pattern match results, as described above with reference to 608 of FIG. 6A. For example, the analysis may include generating a pattern matching score for each of the fine candidate areas and determining the final match results based on the scores. For example, the fine candidate areas may be analyzed and ranked according to match scores, as described above, where a match score for each of the plurality of candidate areas may be determined by calculating a raw score corresponding to each pattern matching technique, weighting each raw score according to the corresponding pattern matching technique to generate a set of weighted scores for the candidate area, and generating a weighted match score based on the set of weighted scores.

In another embodiment, the fine candidate areas may be analyzed and ranked by the number of 'votes' tallied for each candidate area, where a vote represents one pattern match technique which resulted in, or determined, that candidate area. In other words, if a fine candidate area was determined independently by three different pattern match techniques, then that fine candidate area would have three votes. In another embodiment, the analysis may include determining a 'vote' corresponding to each of the pattern matching techniques, where each vote indicates a best match candidate area for the respective technique. The votes may be tallied, and the fine candidate area receiving the most votes considered the best match.

Finally, in 508, output indicating the final pattern match results may be generated, as described above. In one embodiment, the output may be displayed in the Graphical User Interface.

Figure 8:
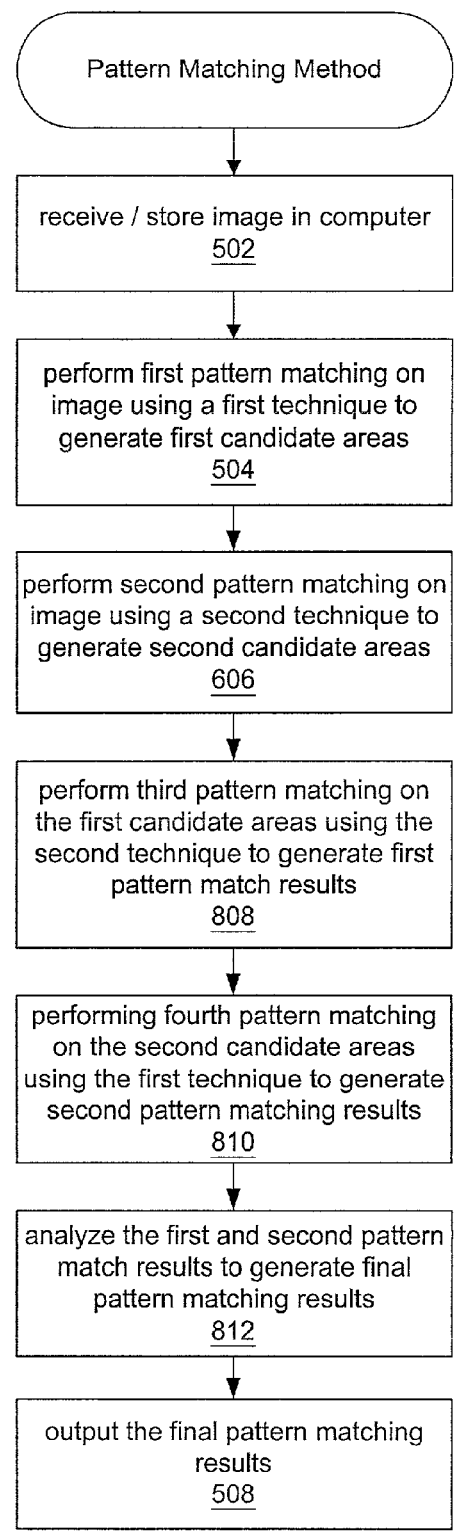
FIG. 8 is a flowchart diagram illustrating a fourth embodiment of a pattern matching method according to one embodiment of the present invention.

FIG. 8—Pattern Matching Flowchart: Fourth Embodiment

FIG. 8 is a flowchart diagram illustrating a method for performing pattern matching according to another embodiment of the present invention. The method uses multiple pattern matching techniques to detect a pattern or template image in a target image. As mentioned above, in various embodiments, some of the steps may be performed in a different order than shown or may be omitted, as desired. Additional steps may also be performed.

As FIG. 8 shows, in 502 the image may be received by and/or stored in the computer system, as described above with reference to FIG. 5.

In 504 first pattern matching may be performed on the image using a first pattern matching technique, thereby determining a first plurality of candidate areas, as described above.

In 606 second pattern matching may be performed on the image using a second different pattern matching technique, thereby generating a second plurality of candidate areas. As mentioned above with reference to FIG. 5, the first and second pattern matching techniques may include any pattern matching techniques operable to detect a pattern in an image, provided that the first and second pattern matching techniques are different.

Then, in 808, third pattern matching may be performed on the first plurality of candidate areas using the second pattern matching technique to generate first pattern match results.

In 810, fourth pattern matching may be performed on the second plurality of candidate areas using the first pattern matching technique to generate second pattern match results.

In one embodiment, the first and second pattern matching may each comprise coarse pattern matching on the image, and the third and fourth pattern matching may each comprise fine pattern matching on the image. Thus, the first pattern matching technique may be performed in a coarse or low-resolution manner on the image, thereby generating the first (coarse) candidate areas. Then, the second pattern matching technique may be applied to each of the first (coarse) candidate areas in a fine or high-resolution manner to generate the first pattern match results. Similarly, the second pattern matching technique may be performed in a coarse or low-resolution manner on the image, thereby generating the second (coarse) candidate areas. Then, the first pattern matching technique may be applied to each of the second (coarse) candidate areas in a fine or high-resolution manner to generate the second pattern match results. Additionally, various of the pattern matching techniques may be performed concurrently, as described above.

In 812, the first match results and the second match results may be analyzed to determine final pattern match results. The analysis may include any of the techniques described above with reference to FIGS. 5 through 7C. In one embodiment, generating the first and second pattern match results may include generating third and fourth candidate areas, respectively, and so the third and fourth candidate areas may be analyzed as described above to determine final pattern match results.

Finally, in 508, an output may be generated indicating the final pattern match results.

Figure 9:
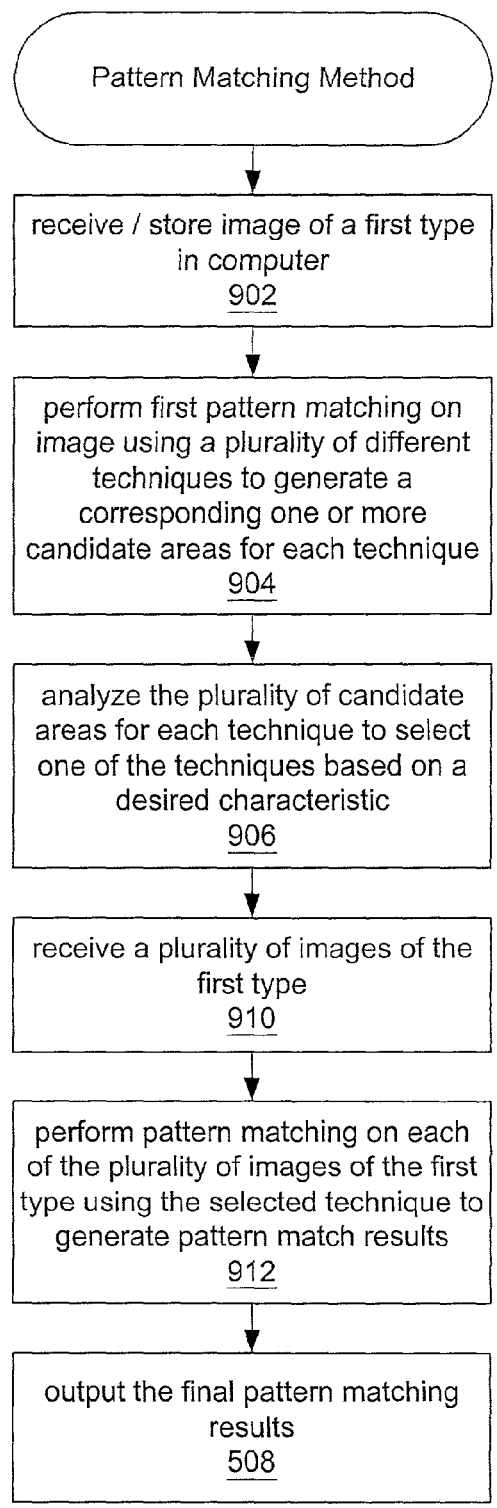
FIG. 9 is a flowchart diagram illustrating a fifth embodiment of a pattern matching method according to one embodiment of the present invention.

FIG. 9—Pattern Matching Flowchart: Fifth Embodiment

FIG. 9 is a flowchart diagram illustrating one embodiment of a method for performing pattern matching using multiple pattern matching techniques to detect a pattern or template image in two or more target images. As mentioned above, in various embodiments, some of the steps may be performed in a different order than shown or may be omitted, as desired. Additional steps may also be performed. Descriptions of steps which are substantially the same as corresponding steps of FIGS. 5-8 may be abbreviated.

As FIG. 9 shows, in 902 an image of a first type, i.e., the target image, may be received by and/or stored in the computer system, as described above. In one embodiment, the image may be a test image which includes one or more known matching patterns. In other words, the image may include patterns which are known to match the template image to various degrees. Thus, the test image may be used to test the efficacy of different matching techniques, as described below.

In 904, first pattern matching may be performed on the image using a plurality of different pattern matching techniques, where the first pattern matching determines one or more candidate areas for each of the plurality of different pattern matching techniques. As mentioned above, any of a variety of different pattern matching techniques may be used to perform the first pattern matching, including hue plane pattern matching, color matching, correlation-based pattern matching, geometric pattern matching, and a luminance pattern matching, among others. In one embodiment, at least one of the plurality of pattern matching techniques may use a sub-sampling technique, such as, for example, a sampling technique based on low discrepancy sequences. In one embodiment, at least one of the plurality of pattern matching techniques may use a hill climbing technique.

In 908, the plurality of candidate areas produced by each of the plurality of different pattern matching techniques may be analyzed to select one of the pattern matching techniques from the plurality of pattern matching techniques. In one embodiment, the selection may be made based on a desired characteristic of a pattern matching task, such as, for example, match accuracy or speed/performance. In an embodiment where the image is a test image with known pattern matching areas, two or more of the pattern matching techniques may be selected from the plurality of pattern matching techniques.

In one embodiment, software executing on the computer system may present a Graphical User Interface (GUI) to the user which operates to receive user input specifying the desired characteristic prior to the analyzing. For example, the user may specify the desired characteristic using a GUI control, such as a slider control whereby the user may select a value indicating a degree of the desired characteristic, as described above with reference to FIG. 7C.

Thus, the results of the first pattern matching using each of the plurality of pattern matching techniques may be analyzed to determine which of the pattern matching techniques is most suitable for image of the first type. The selection may be made based on any of a variety of characteristics, including match scores, speed, and accuracy, among others.

In an embodiment in which the image of the first type is a test image, as mentioned above, the performance of each of the plurality of pattern matching techniques may be compared to pre-determined matching scores for the known matching patterns in the test image. The selection of the pattern matching techniques may then be made based on the degree to which the pattern match agrees with the predetermined matching scores. It is noted that this feature may cull some pattern matching techniques which produce higher match scores than are appropriate for the known matching patterns in the test image, i.e., which result in over-matching, and therefore inaccurate, results.

In 910, a plurality of images of the first type may be received. In other words, more images may be received which are of the same type as the image received in 902. As described above, these images may be received from a variety of sources, including an external image source, a camera comprised in the computer system, i.e., a "smart camera", or from an external system coupled to the computer system over a network, among others.

In 912, pattern matching may be performed on each of the plurality of images of the first type using the selected one of the pattern matching techniques, thereby generating pattern match results. In an embodiment where the image is a test image with known matching patterns, the selected two or more of the pattern matching techniques may be used to perform the pattern matching.

Finally, in 508, an output may be generated indicating the pattern match results, as described above.

In one embodiment, the first pattern matching described in 904 may comprise coarse pattern matching, and may be performed on the image using the plurality of different pattern matching techniques to determine one or more coarse candidate areas for each of the plurality of different pattern matching techniques. Performing the coarse pattern matching may include generating a match score associated with each pattern matching technique for each coarse candidate area.

The method may also include determining a best score from the match scores, where the best score indicates a best pattern match. In this embodiment, the selection of 908 may include selecting a pattern matching technique from the plurality of different pattern matching techniques based on the best score. In other words, a high match score may be the desired characteristic used to select the preferred pattern matching technique.

In this embodiment, the method may then perform fine pattern matching on each of the plurality of coarse candidate areas using the selected pattern matching technique to determine the one or more final match candidate areas, which may then be output, as described above.

As mentioned and described above, various of the pattern matching techniques may be performed concurrently, as desired.

Thus, in a preferred embodiment, the pattern matching performed on the image of the first type received in 902 may be used to ascertain a preferred pattern matching technique for images of the first type. For example, if the image of the first type were a gray-scale image, the results of the first pattern matching performed in 904 may indicate that a luminance pattern matching technique detects the pattern most effectively, and thus, the luminance pattern technique may preferably be used for subsequent images of that type (i.e., gray-scale images). For another example, if the image received in 902 were a diffuse color image, such as a complex thermal image, the preferred pattern matching technique may be a color match technique, or a hue plane pattern match. Thus, in the manner described above, an analysis of pattern matching results performed on an image of a first type may allow more efficient and/or effective pattern matching on subsequent images of the same type.

Although the system and method of the present invention has been described in connection with several embodiments, it is not intended to be limited to the specific forms set forth herein, but on the contrary, it is intended to cover such alternatives, modifications, and equivalents, as can be reasonably included within the spirit and scope of the invention as defined by the appended claims.

We claim:

1. A method for detecting patterns in an image, the method comprising:

performing first pattern matching on the image using a first pattern matching technique, wherein said performing pattern matching determines a plurality of candidate areas;

performing second pattern matching on each of the candidate areas using a second different pattern matching technique, wherein said performing second pattern matching generates final pattern match results; and generating an output indicating the final pattern match results;

wherein at least a portion of said first pattern matching and at least a portion of said second pattern matching are performed concurrently.

2. A method for detecting patterns in an image, the method comprising:

performing first pattern matching on the image using a first pattern matching technique, wherein said performing pattern matching determines a plurality of candidate areas;

performing second pattern matching on each of the candidate areas using a second different pattern matching technique, wherein said performing second pattern matching generates final pattern match results; and generating an output indicating the final pattern match results;

wherein the first pattern matching technique is a geometric pattern matching technique.

3. A method for detecting patterns in an image, the method comprising:

performing first pattern matching on the image using a first pattern matching technique, wherein said performing pattern matching determines a plurality of candidate areas;

performing second pattern matching on each of the candidate areas using a second different pattern matching technique, wherein said performing second pattern matching generates final pattern match results; and generating an output indicating the final pattern match results;

wherein the first pattern matching technique is a correlation-based pattern matching technique.

4. The method of claim 3, wherein the second pattern matching technique is a geometric pattern matching technique.

5. A method for detecting patterns in an image, the method comprising:

performing first pattern matching on the image using a first pattern matching technique, wherein said performing pattern matching determines a plurality of candidate areas;

performing second pattern matching on each of the candidate areas using a second different pattern matching technique, wherein said performing second pattern matching generates final pattern match results; and generating an output indicating the final pattern match results;

wherein the first pattern matching technique is a color matching technique; and wherein the second pattern matching technique is a geometric pattern matching technique.

6. A method for detecting patterns in an image, the method comprising:

performing first pattern matching on the image using a first pattern matching technique, wherein said performing pattern matching determines a plurality of candidate areas;

performing second pattern matching on each of the candidate areas using a second different pattern matching technique, wherein said performing second pattern matching generates final pattern match results; and generating an output indicating the final pattern match results;

wherein the first pattern matching technique is a color matching technique; and wherein the second pattern matching technique is a hue plane pattern matching technique.

7. A method for detecting patterns in an image, the method comprising:

performing first pattern matching on the image using a first pattern matching technique, wherein said performing pattern matching determines a plurality of candidate areas;

performing second pattern matching on each of the candidate areas using a second different pattern matching technique, wherein said performing second pattern matching generates final pattern match results; and generating an output indicating the final pattern match results;

wherein the first pattern matching technique is a hue plane pattern matching technique; and wherein the second pattern matching technique is a color matching technique.

8. A method for detecting patterns in an image, the method comprising:

performing first pattern matching on the image using a first pattern matching technique, wherein said performing pattern matching determines a plurality of candidate areas;

performing second pattern matching on each of the candidate areas using a second different pattern matching technique, wherein said performing second pattern matching generates final pattern match results; and generating an output indicating the final pattern match results;

wherein said performing first pattern matching comprises generating a first pattern matching score for each of the plurality of candidate areas, and wherein said determining a plurality of candidate areas is based on said first pattern matching scores; and wherein said performing second pattern matching comprises generating a second pattern matching score for each of the plurality of candidate areas, and wherein said generating final pattern match results is based on said second pattern matching scores.

9. A method for detecting patterns in an image, the method comprising:

performing first pattern matching on the image using a first pattern matching technique, wherein said performing pattern matching determines a plurality of candidate areas;

performing second pattern matching on each of the candidate areas using a second different pattern matching technique, wherein said performing second pattern matching generates final pattern match results; and generating an output indicating the final pattern match results;

wherein the first pattern matching technique is one of a hue plane pattern matching technique, a color matching technique, a correlation-based pattern matching technique, a geometric pattern matching technique, and a luminance pattern matching technique;

wherein the second pattern matching technique is one of a color matching technique, a correlation-based pattern matching technique, a geometric pattern matching technique, and a luminance pattern matching technique; and wherein said first pattern matching technique is a different technique from said second pattern matching technique.

10. A method for detecting patterns in an image, the method comprising:

performing first pattern matching on the image using a first pattern matching technique, wherein said performing pattern matching determines a plurality of candidate areas;

performing second pattern matching on each of the candidate areas using a second different pattern matching technique, wherein said performing second pattern matching generates final pattern match results; and generating an output indicating the final pattern match results;

wherein said first pattern matching technique is a coarse pattern matching technique; and wherein said second pattern matching technique is a fine pattern matching technique.

11. A method for detecting patterns in an image, the method comprising:

performing first pattern matching on the image using a first pattern matching technique, wherein said performing first pattern matching determines a first plurality of candidate areas;

performing second pattern matching on the image using a second different pattern matching technique, wherein said performing second pattern matching determines a second plurality of candidate areas;

analyzing the first plurality of candidate areas and the second plurality of candidate areas to determine final pattern match results; and generating an output indicating the final pattern match results;

wherein said analyzing the first plurality of candidate areas and the second plurality of candidate areas to determine final pattern match results comprises:
determining one or more final candidate areas which are common to said first plurality of candidate areas and said second plurality of candidate areas; and wherein said final pattern match results comprise said one or more final candidate areas.

12. A method for detecting patterns in an image, the method comprising:

performing first pattern matching on the image using a first pattern matching technique, wherein said performing first pattern matching determines a first plurality of candidate areas;

performing second pattern matching on the image using a second different pattern matching technique, wherein said performing second pattern matching determines a second plurality of candidate areas;

analyzing the first plurality of candidate areas and the second plurality of candidate areas to determine final pattern match results; and generating an output indicating the final pattern match results;

wherein said analyzing the first plurality of candidate areas and the second plurality of candidate areas comprises generating a third plurality of candidate areas, the method further comprising:

performing third pattern matching on each of said third plurality of candidate areas using a third different pattern matching technique to determine final pattern match results.

13. A method for detecting patterns in an image, the method comprising:

performing first pattern matching on the image using a first pattern matching technique, wherein said performing first pattern matching determines a first plurality of candidate areas;

performing second pattern matching on the image using a second different pattern matching technique, wherein said performing second pattern matching determines a second plurality of candidate areas;

analyzing the first plurality of candidate areas and the second plurality of candidate areas to determine final pattern match results; and generating an output indicating the final pattern match results;

wherein at least a portion of said second pattern matching is performed concurrently with said performing first pattern matching.

14. The method of claim 13, wherein said performing at least a portion of second pattern matching concurrently with said first pattern matching comprises performing said second pattern matching concurrently with said first pattern matching using a multiprocessor computer system.

15. The method of claim 13, wherein said performing second pattern matching concurrently with said first pattern matching comprises performing said second pattern matching concurrently with said first pattern matching using a plurality of programmable hardware elements.

16. The method of claim 13, wherein said performing second pattern matching concurrently with said first pattern matching comprises performing said second pattern matching concurrently with said first pattern matching using one or more processors and one or more programmable hardware elements.

17. A method for detecting patterns in an image, the method comprising:

performing first pattern matching on the image using a first pattern matching technique, wherein said performing first pattern matching determines a first plurality of candidate areas; generating a pattern matching score for each of the first plurality of candidate areas;

performing second pattern matching on the image using a second different pattern matching technique, wherein said performing second pattern matching determines a second plurality of candidate areas;

generating a pattern matching score for each of the second plurality of candidate areas;

analyzing the first plurality of candidate areas and the second plurality of candidate areas to determine final pattern match results, wherein said analyzing comprises analyzing the pattern matching scores for each of the first plurality of candidate areas and the second plurality of candidate areas; and generating an output indicating the final pattern match results.

18. A method for detecting patterns in an image, the method comprising:

performing first pattern matching on the image using a first pattern matching technique, wherein said performing first pattern matching determines a first plurality of candidate areas, wherein the first pattern matching technique is one of a hue plane pattern matching technique, a color matching technique, a correlation-based pattern matching technique, a geometric pattern matching technique, and a luminance pattern matching technique;

performing second pattern matching on the image using a second different pattern matching technique, wherein said performing second pattern matching determines a second plurality of candidate areas, wherein the second pattern matching technique is one of a color matching technique, a correlation-based pattern matching technique, a geometric pattern matching technique, and a luminance pattern matching technique, and wherein said first pattern matching technique is a different technique from said second pattern matching technique;

analyzing the first plurality of candidate areas and the second plurality of candidate areas to determine final pattern match results; and generating an output indicating the final pattern match results.

19. A method for detecting patterns in an image, the method comprising:

performing first pattern matching on the image using a first pattern matching technique, wherein said performing first pattern matching determines a first plurality of candidate areas;

performing second pattern matching on the image using a second different pattern matching technique, wherein said performing second pattern matching determines a second plurality of candidate areas;

performing third pattern matching on the image using a third different pattern matching technique, wherein said performing pattern matching determines a third plurality of candidate areas;

analyzing the first plurality of candidate areas, the second plurality of candidate areas, and the third plurality of candidate areas to determine final pattern match results; and generating an output indicating the final pattern match results.

20. The method of claim 19, wherein said first pattern matching technique, said second pattern matching technique, and said third pattern matching technique are each one of a hue plane pattern matching technique, a color matching technique, a correlation-based pattern matching technique, a geometric pattern matching technique, and a luminance pattern matching technique; and wherein said first pattern matching technique, said second pattern matching technique, and said third pattern matching technique are different.

21. A method for detecting patterns in an image, the method comprising:

performing first pattern matching on the image using a first pattern matching technique, wherein said performing first pattern matching determines a first plurality of candidate areas, wherein said first pattern matching technique is a coarse pattern matching technique;

performing second pattern matching on the image using a second different pattern matching technique, wherein said performing second pattern matching determines a second plurality of candidate areas, wherein said second pattern matching technique is a fine pattern matching technique;

analyzing the first plurality of candidate areas and the second plurality of candidate areas to determine final pattern match results; and generating an output indicating the final pattern match results.

22. A method for detecting patterns in an image, the method comprising:

performing first pattern matching on the image using a first pattern matching technique, wherein said performing first pattern matching determines a first plurality of candidate areas;

performing second pattern matching on the image using a second different pattern matching technique, wherein said performing second pattern matching determines a second plurality of candidate areas, wherein at least one of said first pattern matching technique and said second pattern matching technique uses a hill-climbing technique;

analyzing the first plurality of candidate areas and the second plurality of candidate areas to determine final pattern match results; and generating an output indicating the final pattern match results.

23. A method for detecting patterns in an image, the method comprising:

performing first pattern matching on the image using a plurality of different pattern matching techniques, wherein said performing first pattern matching determines a plurality of candidate areas for each of said plurality of different pattern matching techniques, wherein said performing first pattern matching on the image using a plurality of different pattern matching techniques comprises calculating a matching score for each of the plurality of candidate areas;

analyzing the plurality of candidate areas produced by each of said plurality of different pattern matching techniques to determine pattern match results, wherein said analyzing comprises analyzing said matching scores to determine said pattern match results; and generating an output indicating the pattern match results.

24. The method of claim 23, wherein said analyzing matching scores comprises:

weighting each of said matching scores according to the pattern matching technique used; and analyzing said weighted matching scores to determine said pattern match results.

25. The method of claim 23, wherein said calculating a matching score for each of the plurality of candidate areas comprises:

for each respective candidate area of the plurality of candidate areas:

calculating a raw score corresponding to each pattern matching technique;

weighting each raw score according to the corresponding pattern matching technique to generate a set of weighted scores for the respective candidate area; and generating a matching score based on the set of weighted scores.

26. A method for detecting patterns in an image, the method comprising:

performing first pattern matching on the image using a plurality of different pattern matching techniques, wherein said performing first pattern matching determines a plurality of candidate areas for each of said plurality of different pattern matching techniques;

analyzing the plurality of candidate areas produced by each of said plurality of different pattern matching techniques to determine pattern match results, wherein said analyzing the plurality of candidate areas comprises generating a plurality of intermediate candidate areas;

performing second pattern matching on each of said plurality of intermediate candidate areas using a high-resolution pattern matching technique to determine final pattern match results; and generating an output indicating the pattern match results.

27. A method for detecting patterns in an image, the method comprising:

performing first pattern matching on the image using a plurality of different pattern matching techniques, wherein said performing first pattern matching determines a plurality of candidate areas for each of said plurality of different pattern matching techniques, wherein the first pattern matching comprises coarse pattern matching, and wherein the plurality of candidate areas comprises a plurality of coarse candidate areas;

analyzing the plurality of candidate areas produced by each of said plurality of different pattern matching techniques to determine pattern match results, wherein the analyzing comprises determining a subset of the plurality of pattern matching techniques based on a metric;

generating an output indicating the pattern match results;

performing second pattern matching on each of the plurality of coarse candidate areas using the subset of pattern matching techniques, wherein the performing second pattern matching determines one or more fine candidate areas for each of the subset of pattern matching techniques;

analyzing the one or more fine candidate areas produced by each of the subset of pattern matching techniques to determine final pattern match results; and generating an output indicating the final pattern match results.

28. The method of claim 27, wherein said metric indicates a desired characteristic of the subset of pattern matching techniques.

29. The method of claim 27, wherein said metric indicates a desired degree of accuracy or speed for the subset of pattern matching techniques.

30. The method of claim 27, wherein said metric indicates a desired degree of one or more of accuracy and speed for the subset of pattern matching techniques, wherein said accuracy and said speed are inversely related.

31. The method of claim 27, further comprising:

a user specifying said metric, wherein said metric indicates a desired characteristic of the subset of pattern matching techniques.

32. The method of claim 31, wherein the user specifying said metric comprises the user specifying said metric using a Graphical User Interface (GUI) control.

33. The method of claim 32,
wherein said Graphical User Interface (GUI) control comprises a slider control;
wherein said slider control is operable by the user to select a value indicating a degree of said desired characteristic.

34. A method for detecting patterns in an image, the method comprising:
performing first pattern matching on the image using a plurality of different pattern matching techniques, wherein said performing first pattern matching determines a plurality of candidate areas for each of said plurality of different pattern matching techniques, wherein at least a portion of said plurality of pattern matching techniques are performed concurrently;
analyzing the plurality of candidate areas produced by each of said plurality of different pattern matching techniques to determine pattern match results; and
generating an output indicating the pattern match results.

35. A method for detecting a pattern in an image, the method comprising:
a Graphical User Interface (GUI) receiving user input specifying a desired characteristic of a pattern matching task;
performing coarse pattern matching on the image using a plurality of different pattern matching techniques, wherein said performing coarse pattern matching determines a plurality of coarse candidate areas for each of said plurality of different pattern matching techniques;
analyzing the plurality of coarse candidate areas produced by each of said plurality of different pattern matching techniques to select one or more of the pattern matching techniques in accordance with said desired characteristic;
performing fine pattern matching on each of the plurality of coarse candidate areas using said selected one or more pattern matching techniques to determine one or more final match candidate areas; and
generating an output indicating the final match candidate areas, wherein the final match candidate areas each includes the detected pattern.

36. The method of claim 35, wherein the GUI includes a graphical control, and wherein the user specifying said desired characteristic comprises the user specifying said characteristic using a Graphical User Interface (GUI) control.

37. The method of claim 36,
wherein said control comprises a slider control; and
wherein said slider control is operable by the user to select a value indicating a degree of said desired characteristic.

38. The method of claim 35, wherein said generating an output comprises:
displaying said output in said GUI.

39. The method of claim 35, further comprising:
generating a match score for each of the plurality of coarse candidate areas; and
calculating a metric for each of the plurality of different pattern matching techniques indicating a degree of said desired characteristic with respect to said coarse pattern matching.

40. The method of claim 39, wherein said generating a match score for each of the plurality of candidate areas comprises:
for each respective candidate area of the plurality of candidate areas:
calculating a raw score corresponding to each pattern matching technique;
weighting each raw score according to the corresponding pattern matching technique to generate a set of weighted scores for the respective candidate area; and
generating a match score based on the set of weighted scores.

41. The method of claim 39,
wherein said metric indicates a desired degree of accuracy or speed for the one or more selected pattern matching techniques, wherein said accuracy and said speed are inversely related.

42. The method of claim 35,
wherein the plurality of pattern matching techniques comprises two or more of a hue plane pattern matching technique, a color matching technique, a correlation-based pattern matching technique, a geometric pattern matching technique, and a luminance pattern matching technique.

43. A method for detecting patterns in an image, the method comprising:
performing first pattern matching on the image using a first pattern matching technique, wherein said performing pattern matching determines a first plurality of candidate areas;
performing second pattern matching on the image using a second different pattern matching technique, wherein said performing pattern matching determines a second plurality of candidate areas;
analyzing the first plurality of candidate areas and the second plurality of candidate areas to determine a third plurality of candidate areas;
performing third pattern matching on each of the third plurality of candidate areas using a third different pattern matching technique, wherein said performing third pattern matching generates final pattern match results; and
generating an output indicating the final pattern match results.

44. The method of claim 43,
wherein said third plurality of candidate areas comprises candidate areas common to both the first plurality of candidate areas and the second plurality of candidate areas.

45. The method of claim 43,
wherein said first and second pattern matching comprise coarse pattern matching, and wherein said third pattern matching comprises fine pattern matching.

46. The method of claim 43,
wherein at least a portion of said first pattern matching and at least a portion of said second pattern matching are performed concurrently.

47. The method of claim 43,
wherein at least a portion of said first pattern matching, at least a portion of said second pattern matching, and at least a portion of said third pattern matching are performed concurrently.

48. A method for detecting patterns in an image, the method comprising:
performing first pattern matching on the image using a first pattern matching technique, wherein said performing first pattern matching determines a first plurality of candidate areas;
performing second pattern matching on the image using a second pattern matching technique, wherein the second pattern matching technique is different than the first pattern matching technique, wherein said performing second pattern matching determines a second plurality of candidate areas;

performing third pattern matching on the first plurality of candidate areas using the second pattern matching technique to generate first pattern match results;

performing fourth pattern matching on the second plurality of candidate areas using the first pattern matching technique to generate second pattern match results;

analyzing the first match results and the second match results to determine final pattern match results; and generating an output indicating the final pattern match results.

49. The method of claim 48, wherein said first pattern matching technique and said second pattern matching technique are each one of a hue plane pattern matching technique, a color matching technique, a correlation-based pattern matching technique, a geometric pattern matching technique, and a luminance pattern matching technique; and
wherein said first pattern matching technique and said second pattern matching technique are different.

50. The method of claim 48, wherein said first pattern matching technique is based on normalized correlation, and wherein said second pattern matching technique is based on geometric pattern matching.

51. The method of claim 50, wherein said normalized correlation is performed with one or more of complete sampling, over-sampling, and under-sampling.

52. The method of claim 51, wherein under-sampling comprises sampling using a low discrepancy sequence.

53. The method of claim 50, wherein said geometric pattern matching comprises luminance pattern matching.

54. The method of claim 50, wherein said geometric pattern matching comprises hue plane pattern matching.

55. The method of claim 48, wherein said first pattern matching technique is based on geometric pattern matching, and wherein said second pattern matching technique is based on normalized correlation.

56. The method of claim 48, wherein said performing first pattern matching and performing second pattern matching each comprises performing coarse pattern matching on the image; and
wherein said performing third pattern matching and performing fourth pattern matching each comprises performing fine pattern matching on the image.

57. A method for detecting patterns in an image, the method comprising:
performing coarse pattern matching on the image using a plurality of different pattern matching techniques, wherein said performing coarse pattern matching determines one or more coarse candidate areas for each of said plurality of different pattern matching techniques, and wherein said performing coarse pattern matching generates a match score associated with each pattern matching technique for each coarse candidate area;
determining a best score from said match scores, wherein said best score indicates a best pattern match;
selecting a pattern matching technique from said plurality of different pattern matching techniques based on said best score;
performing fine pattern matching on each of the plurality of coarse candidate areas using said selected pattern matching technique to determine one or more final match candidate areas; and
generating an output indicating the final match candidate areas, wherein the final match candidate areas each include the detected pattern.

58. The method of claim 57,
wherein the plurality of pattern matching techniques includes two or more of a hue plane pattern matching technique, a color matching technique, a correlation-based pattern matching technique, a geometric pattern matching technique, and a luminance pattern matching technique.

59. The method of claim 57, wherein at least one of said plurality of pattern matching techniques uses a sub-sampling technique.

60. The method of claim 57, wherein at least one of said plurality of pattern matching techniques uses a sampling technique based on low discrepancy sequences.

61. The method of claim 57, wherein at least one of said plurality of pattern matching techniques uses a hill climbing technique.

62. The method of claim 57,
wherein at least a portion of said plurality of pattern matching techniques are performed concurrently.

63. The method of claim 57,
wherein the image comprises a test image with one or more known matching patterns;
wherein said determining a best score from said match scores further comprises determining two or more best scores, wherein said two or more best scores indicate best pattern matches;
wherein said selecting a pattern matching technique from said plurality of different pattern matching techniques further comprises selecting two or more pattern matching techniques from said plurality of different pattern matching techniques based on said two or more best scores; and
wherein said performing fine pattern matching on each of the plurality of coarse candidate areas comprises using said selected two or more pattern matching techniques to determine one or more final match candidate areas.

64. A system for detecting a pattern in an image, the system comprising:
a camera which is operable to generate an image;
a processor; and
a memory medium coupled to the processor, wherein the memory medium stores one or more pattern matching programs for detecting patterns in the image, and wherein the memory medium further stores a Graphical User Interface (GUI) program;
wherein the processor is operable to execute the GUI program to implement:
receiving user input specifying a desired characteristic of a pattern matching task;
wherein the processor is further operable to execute the one or more pattern matching programs to implement:
performing a coarse pattern matching search on the image using a plurality of different pattern matching techniques, wherein said performing a coarse pattern matching search determines one or more coarse candidate areas for each of said plurality of different pattern matching techniques;
analyzing the one or more coarse candidate areas produced by each of said plurality of different pattern matching techniques to select one or more of the pattern matching techniques in accordance with said desired characteristic;
performing a fine pattern matching search on each of the coarse candidate areas using said selected one or more pattern matching techniques to determine one or more final match candidate areas; and generating an output indicating the one or more final match candidate areas, wherein the one or more final match candidate areas each include the detected pattern.

65. A system for detecting patterns in an image, the system comprising:
a camera which is operable to generate an image;
a processor; and
a memory medium coupled to the processor, wherein the memory medium stores one or more pattern matching programs for detecting patterns in the image;
wherein the processor is operable to execute the one or more pattern matching programs to implement:
applying a first pattern matching technique to the image to determine a first plurality of candidate areas;
applying a second pattern matching technique to the image to determine a second plurality of candidate areas;
analyzing the first plurality of candidate areas and the second plurality of candidate areas to determine a third plurality of candidate areas;
generating output indicating the final match candidate areas, wherein the final match candidate areas each includes the detected pattern.
applying a third different pattern matching technique to each of the third plurality of candidate areas, thereby generating final pattern match results; and
generating output indicating the final pattern match results.

66. A system for detecting patterns in an image, the system comprising:
a camera which is operable to generate an image;
a processor; and
a memory medium coupled to the processor, wherein the memory medium stores one or more pattern matching programs for detecting patterns in the image;
wherein the processor is operable to execute the one or more pattern matching programs to implement:
performing a coarse pattern matching search on the image using a plurality of different pattern matching techniques, wherein said performing a coarse pattern matching search determines one or more coarse candidate areas for each of said plurality of different pattern matching techniques, and wherein said performing a coarse pattern matching search generates a match score associated with each pattern matching technique for each coarse candidate area;
determining a best score from said match scores, wherein said best score indicates a best pattern match;
selecting a pattern matching technique from said plurality of different pattern matching techniques based on said best score;
performing a fine pattern matching search on each of the plurality of coarse candidate areas using said selected pattern matching technique to determine one or more final match candidate areas; and
generating output indicating the final match candidate areas, wherein the final match candidate areas each includes the detected pattern.

67. A system for detecting a pattern in an image, the system comprising:
means for receiving user input specifying a desired characteristic of a pattern matching task;
means for performing coarse pattern matching on the image using a plurality of different pattern matching techniques, thereby generating a plurality of coarse candidate areas for each of said plurality of different pattern matching techniques;
means for analyzing the plurality of coarse candidate areas generated by each of the plurality of different pattern matching techniques to select one or more of the pattern matching techniques in accordance with said desired characteristic;
means for performing fine pattern matching on each of the plurality of coarse candidate areas using the selected one or more pattern matching techniques, thereby generating one or more final match candidate areas; and
means for producing an output indicating the final match candidate areas, wherein each of the final match candidate areas includes the detected pattern.

68. A system for detecting patterns in an image, the system comprising:
means for performing first pattern matching on the image using a first pattern matching technique to generate a first plurality of candidate areas in the image;
means for performing second pattern matching on the image using a second different pattern matching technique to generate a second plurality of candidate areas in the image;
means for analyzing the first plurality of candidate areas and the second plurality of candidate areas to determine a third plurality of candidate areas;
means for performing third pattern matching on each of the third plurality of candidate areas using a third different pattern matching technique to generate final pattern match results; and
means for generating an output indicating the final pattern match results.

69. A computer readable medium comprising program instructions for detecting a pattern in an image, wherein the program instructions are executable by one or more processors to implement:
a Graphical User Interface (GUI) receiving user input specifying a desired characteristic of a pattern matching task;
performing coarse pattern matching on the image using two or more different pattern matching techniques, thereby generating a plurality of coarse candidate areas for each of the plurality of different pattern matching techniques;
performing an analysis of the plurality of coarse candidate areas generated by each of the two or more different pattern matching techniques to select one or more of the pattern matching techniques in accordance with said desired characteristic;
performing fine pattern matching on each of the plurality of coarse candidate areas using said selected one or more pattern matching techniques to determine one or more final match candidate areas; and
producing an output indicating the one or more final match candidate areas, wherein the final match candidate areas each includes the detected pattern.

70. A computer readable medium comprising program instructions for detecting a pattern in an image, wherein the program instructions are executable by one or more processors to implement:
performing a first pattern matching search on the image using a first pattern matching technique to generate a first plurality of candidate areas;
performing a second pattern matching search on the image using a second different pattern matching technique to generate a second plurality of candidate areas;

performing an analysis of the first plurality of candidate areas and the second plurality of candidate areas to determine a third plurality of candidate areas;

performing a third pattern matching search on each of the third plurality of candidate areas using a third different pattern matching technique, thereby producing final pattern match results; and output the final pattern match results.

71. A computer readable medium comprising program instructions for detecting a pattern in an image, wherein the program instructions are executable by one or more processors to implement:

performing coarse pattern matching on the image using a plurality of different pattern matching techniques to determine one or more coarse candidate areas for each of said plurality of different pattern matching techniques, wherein said performing coarse pattern matching generates a match score for each coarse candidate area associated with each pattern matching technique;

determining a best score from said match scores, wherein said best score indicates a best pattern match;

selecting a pattern matching technique from said plurality of different pattern matching techniques corresponding to said best score;

performing fine pattern matching on each of the plurality of coarse candidate areas using said selected pattern matching technique to determine one or more final match candidate areas; and generating an output indicating the one or more final match candidate areas, wherein the one or more final match candidate areas each includes the detected pattern.

* * * * *

UNITED STATES PATENT AND TRADEMARK OFFICE
CERTIFICATE OF CORRECTION

| | | |
|---|---|---|
| PATENT NO. | : 7,233,699 B2 | Page 1 of 1 |
| APPLICATION NO. | : 10/100418 | |
| DATED | : June 19, 2007 | |
| INVENTOR(S) | : Wenzel et al. | |

It is certified that error appears in the above-identified patent and that said Letters Patent is hereby corrected as shown below:

Title Page, Item

(56)　　　References Cited, insert

--6,370,270 B1　　04/2002 Nair et al . . . . . . . 382/209--

Claims:

Column 35 Lines 21 - 25, please delete:
　　"third party of candidate areas;
generating output indicating the final match candidate
　　areas, wherein the final match candidate areas each
　　includes the detected pattern.
applying a third different pattern matching technique to"
and substitute
　　-- third party of candidate areas;
applying a third different pattern matching technique to --.

Signed and Sealed this

Seventh Day of August, 2007

JON W. DUDAS
*Director of the United States Patent and Trademark Office*